United States Patent
Sakurada et al.

(10) Patent No.: US 11,941,549 B2
(45) Date of Patent: Mar. 26, 2024

(54) MANAGEMENT DEVICE OF AUTONOMOUS DRIVING VEHICLE

(71) Applicant: TOYOTA JIDOSHA KABUSHIKI KAISHA, Aichi-Ken (JP)

(72) Inventors: Shin Sakurada, Toyota (JP); Katsuya Hoshi, Nisshin (JP); Hiroaki Sugiyama, Nagoya (JP); Masahisa Sawada, Nagoya (JP); Hiroyuki Ito, Kariya (JP); Makoto Segi, Kariya (JP); Hiroki Hattori, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 95 days.

(21) Appl. No.: 17/673,788

(22) Filed: Feb. 17, 2022

(65) Prior Publication Data
US 2022/0261707 A1 Aug. 18, 2022

(30) Foreign Application Priority Data
Feb. 18, 2021 (JP) .................. 2021-023872

(51) Int. Cl.
G06Q 10/02 (2012.01)
G06Q 30/0207 (2023.01)
(Continued)

(52) U.S. Cl.
CPC ......... *G06Q 10/02* (2013.01); *G06Q 30/0207* (2013.01); *G08G 1/0133* (2013.01); *G08G 1/202* (2013.01)

(58) Field of Classification Search
CPC .................................................. G06Q 10/02
See application file for complete search history.

(56) References Cited

U.S. PATENT DOCUMENTS

2010/0320013 A1* 12/2010 Tomberlin ........... B62D 31/003
180/65.1
2020/0167883 A1 5/2020 Yamashita et al.
(Continued)

FOREIGN PATENT DOCUMENTS

CN 106297383 A 1/2017
CN 107527520 A 12/2017
(Continued)

OTHER PUBLICATIONS

J. Bischoff, M. Maciejewski, T. Schlenther and K. Nagel, "Autonomous Vehicles and their Impact on Parking Search," in IEEE Intelligent Transportation Systems Magazine, vol. 11, No. 4, pp. 19-27, winter 2019, doi: 10.1109/MITS.2018.2876566 (Year: 2019).*

*Primary Examiner* — Scott M Tungate
(74) *Attorney, Agent, or Firm* — HAUPTMAN HAM, LLP

(57) ABSTRACT

The management device of an autonomous driving vehicle includes a congestion rate calculation unit and a waiting place setting unit. The congestion rate calculation unit is able to calculate the congestion rate of a parking lot adjoining each of a plurality of commercial facilities. In a case where the congestion rate of a neighbor parking lot, or a parking lot in the neighborhood of a boarding place contained in reservation information for an autonomous driving vehicle reserved for dispatch, during a waiting time period before the scheduled boarding time, is less than a congestion threshold, the waiting place setting unit sets the neighbor parking lot as a waiting place for the autonomous driving vehicle to wait during the waiting time period.

2 Claims, 16 Drawing Sheets

(51) Int. Cl.
*G08G 1/00* (2006.01)
*G08G 1/01* (2006.01)

(56) References Cited

U.S. PATENT DOCUMENTS

2020/0191593 A1* 6/2020 Herman ................ G06Q 10/02
2020/0258123 A1* 8/2020 Kobayashi ......... G06Q 30/0261

FOREIGN PATENT DOCUMENTS

| | | |
|---|---|---|
| CN | 109035855 A | 12/2018 |
| JP | 2012048563 A | 3/2012 |
| JP | 201657946 A | 4/2016 |
| JP | 201691411 A | 5/2016 |
| JP | 2019-175403 A | 10/2019 |
| JP | 2020-086945 A | 6/2020 |
| WO | WO-2021163160 A1 * | 8/2021 ............. G01C 21/34 |

* cited by examiner

MANAGEMENT DEVICE OF AUTONOMOUS DRIVING VEHICLE

CROSS REFERENCE TO RELATED APPLICATION

This application claims priority to Japanese Patent Application No. 2021-023872, filed on Feb. 18, 2021, which is incorporated herein by reference in its entirety including the specification, claims, drawings, and abstract.

TECHNICAL FIELD

This specification discloses a management device of an autonomous driving vehicle.

BACKGROUND

Traditionally, autonomous driving vehicles that run with autonomous driving, instead of being driven by a driver, have been known. For example, JP 2016-57946A discloses a car sharing service utilizing autonomous driving vehicles. According to this service, a scheduled boarding time and the location of a vehicle stop (a boarding stop and a alighting stop) where a user is to board or alight a vehicle are designated to the user when the user reserves vehicle dispatch.

In addition, JP 2016-91411A discloses that an autonomous driving vehicle available for dispatch, and a boarding place, are determined for a user, for example, based on the current locations or the like of the user and vehicles.

An autonomous driving vehicle reserved for dispatch may arrive at a boarding place or a place in the neighborhood of the boarding place to wait there by a time before the scheduled boarding time, for example, a time about one hour before the scheduled boarding time, in order to assure that the vehicle will be ready at the boarding place at the scheduled boarding time. In the above, however, if the autonomous driving vehicle is waiting on a road, for example, the vehicle may cause traffic congestion while waiting for a user.

To address the above, the vehicle may park in a parking lot of a commercial facility, such as a convenience store, in the neighborhood of the boarding place. In this case, however, the vehicle that is waiting may cause congestion of the parking lot, possibly making less parking spaces available for users of the commercial facility.

In view of the above, this specification discloses a management device of an autonomous driving vehicle that can prevent a delay of an autonomous driving vehicle in arriving at a scheduled boarding time, without hindering convenience of the parking lots of commercial facilities.

SUMMARY

A management device of an autonomous driving vehicle disclosed in this specification includes a congestion rate calculation unit and a waiting place setting unit. The congestion rate calculation unit can measure the congestion rate of a parking lot adjoining each of a plurality of commercial facilities. In a case where the congestion rate of a neighbor parking lot, or a parking lot in the neighborhood of a boarding place contained in reservation information for an autonomous driving vehicle reserved for dispatch, during a waiting time period before a scheduled boarding time, is less than a congestion threshold, the waiting place setting unit sets the neighbor parking lot as a waiting place where the autonomous driving vehicle wait during the waiting time period.

With the above-described structure, the neighbor parking lot is used as a waiting place for an autonomous driving vehicle when the neighbor parking lot has a sufficient vacant parking space. This can prevent hindering convenience for users of the commercial facility adjoining the neighbor parking lot.

In the above-described structure, the management device of an autonomous driving vehicle may include a vehicle dispatch reservation setting unit and a service granting unit. In a case where the boarding place designated by the user in reserving vehicle dispatch is different from any of the parking lots adjoining a plurality of respective commercial facilities, the vehicle dispatch reservation setting unit may send a suggestion message to the user to suggest change of the boarding place to a parking lot in the neighborhood of the designated boarding place. If the boarding place is changed to the parking lot suggested with the suggestion message, the service granting unit may grant, to the user, a preferential service usable in the commercial facility adjoining the suggested parking lot.

The above-described structure can encourage the user to shop at the commercial facility that leases its parking lot to be used as a waiting place for the autonomous driving vehicle.

A management device of an autonomous driving vehicle disclosed in this specification includes a congestion rate calculation unit, a vehicle dispatch reservation setting unit, and a waiting place setting unit. The congestion rate calculation unit can measure the congestion rate of a parking lot adjoining each of the plurality of commercial facilities. The vehicle dispatch reservation setting unit obtains the frequency of designation of a boarding place for every time period and for every area, based on boarding place history contained in past vehicle dispatch reservation information for an autonomous driving vehicle. In a case where the congestion rate of a parking lot located in a high frequency area having a highly frequent time period in which designation frequency is in excess of the frequency threshold, during a waiting time period before the highly frequent time period is less than a congestion threshold, the waiting place setting unit sets the parking lot as a waiting place where an autonomous driving vehicle not reserved for dispatch wait during the waiting time period.

With the above-described structure, a so-called prospective vehicle dispatch is implemented to have an autonomous driving vehicle not reserved for dispatch, wait in advance in an area where and in a time period during which designation of a boarding place is made with high frequency. This can prevent delay of an autonomous driving vehicle in arriving at a scheduled boarding time.

The management device of an autonomous driving vehicle disclosed in this specification makes it possible to prevent a delay of an autonomous driving vehicle in arriving at a scheduled boarding time, without hindering convenience of the parking lots of commercial facilities.

BRIEF DESCRIPTION OF DRAWINGS

Embodiment(s) of the present disclosure will be described based on the following figures, wherein.

DESCRIPTION OF EMBODIMENTS

Figure 1:
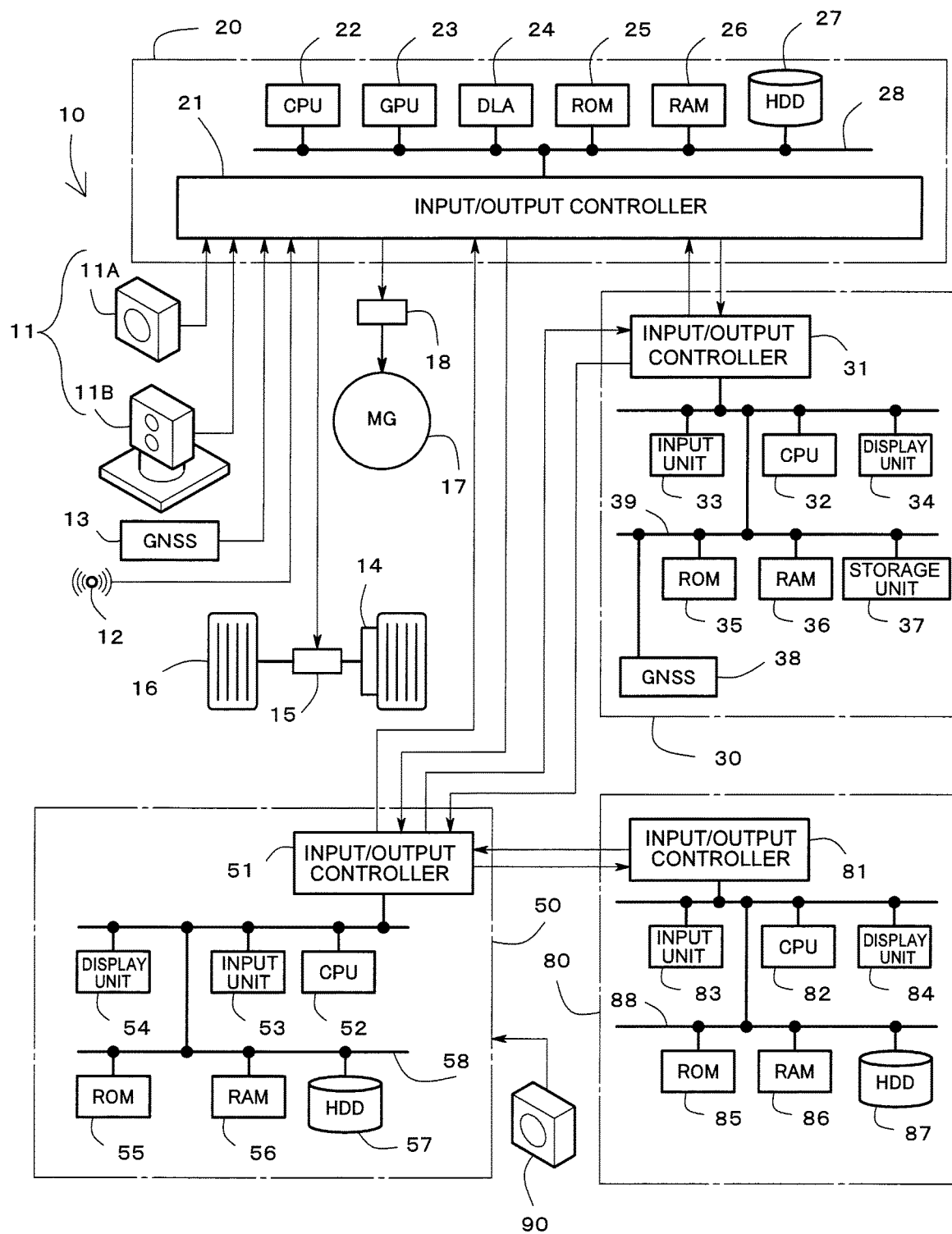
FIG. 1 illustrates an exemplary hardware structure of an autonomous driving vehicle management system including a management device of an autonomous driving vehicle according to this embodiment.

Embodiments of the present disclosure will now be described below, referring to the drawings. Note that the shapes, materials, numbers of items, and values described below are only for illustration of examples, and can be arbitrarily changed depending on the specifications of the management device of autonomous driving vehicles and the managing system of autonomous driving vehicles. Components that are equivalent in all drawings will be given the same reference signs in the description below.

Figure 4:
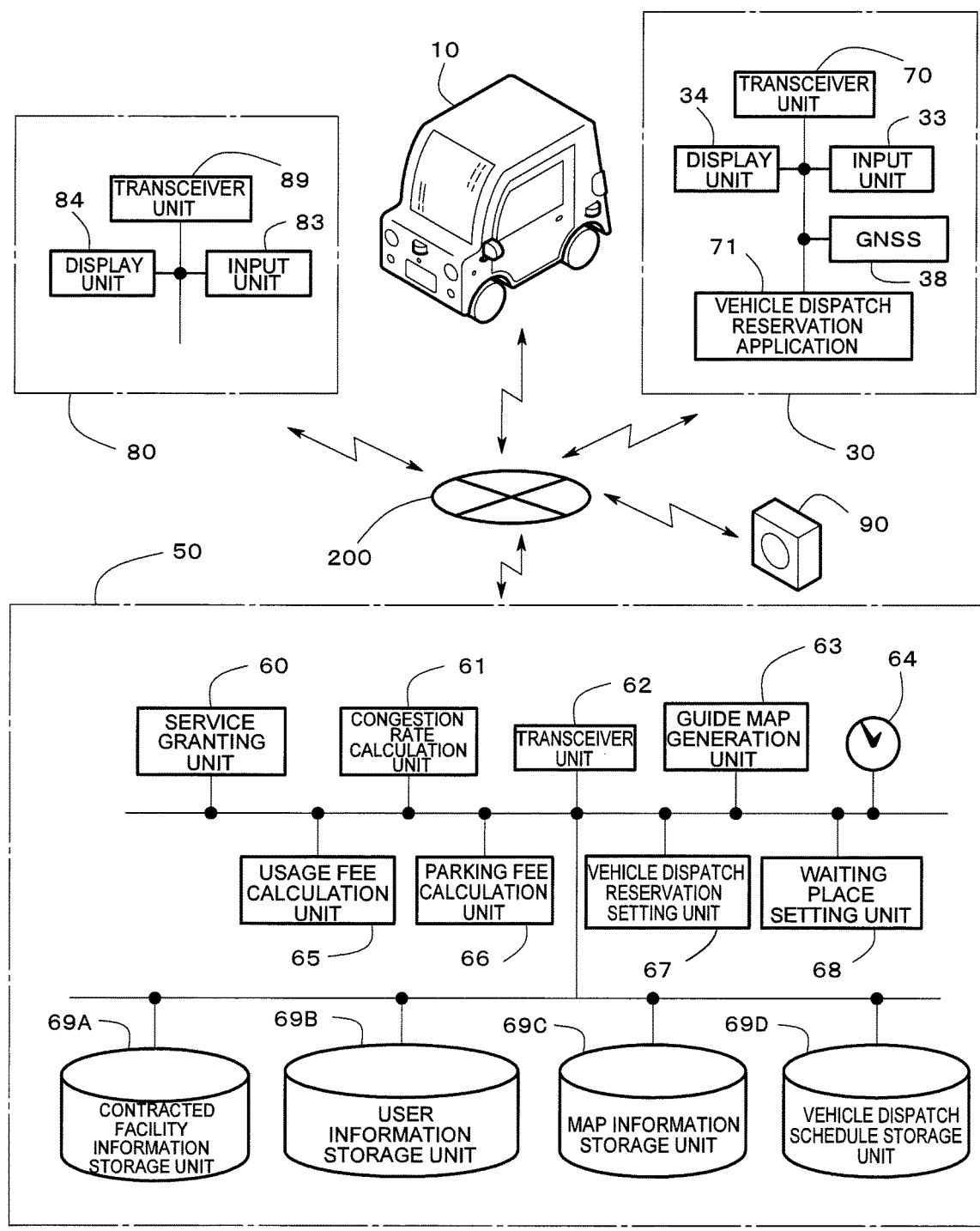
FIG. 4 is a functional block diagram of a management system of an autonomous driving vehicle according to this embodiment.

FIG. 1 illustrates an exemplary hardware structure of the management system of an autonomous driving vehicle according to this embodiment. FIG. 4 is a diagram illustrating the above-described system, partially including functional blocks. The management system of an autonomous driving vehicle according to this embodiment includes an autonomous driving vehicle 10, a portable terminal 30 (a user terminal), a management device 50, a contracted facility terminal 80, and a monitoring camera 90.

The autonomous driving vehicle 10, the portable terminal 30 (a user terminal), the management device 50, the contracted facility terminal 80, and the monitoring camera 90 can communicate with each other via communication means, such as the Internet 200 (refer to FIG. 4). The autonomous driving vehicle 10 can move with autonomous driving. The portable terminal 30 is carried by a user of the transportation service utilizing autonomous driving vehicles. Hence, the autonomous driving vehicle 10 and the portable terminal 30, or moving objects, can communicate with the management device 50 and the contracted facility terminal 80, respectively, via radio communication.

<Autonomous Driving Vehicle>

Figure 2:
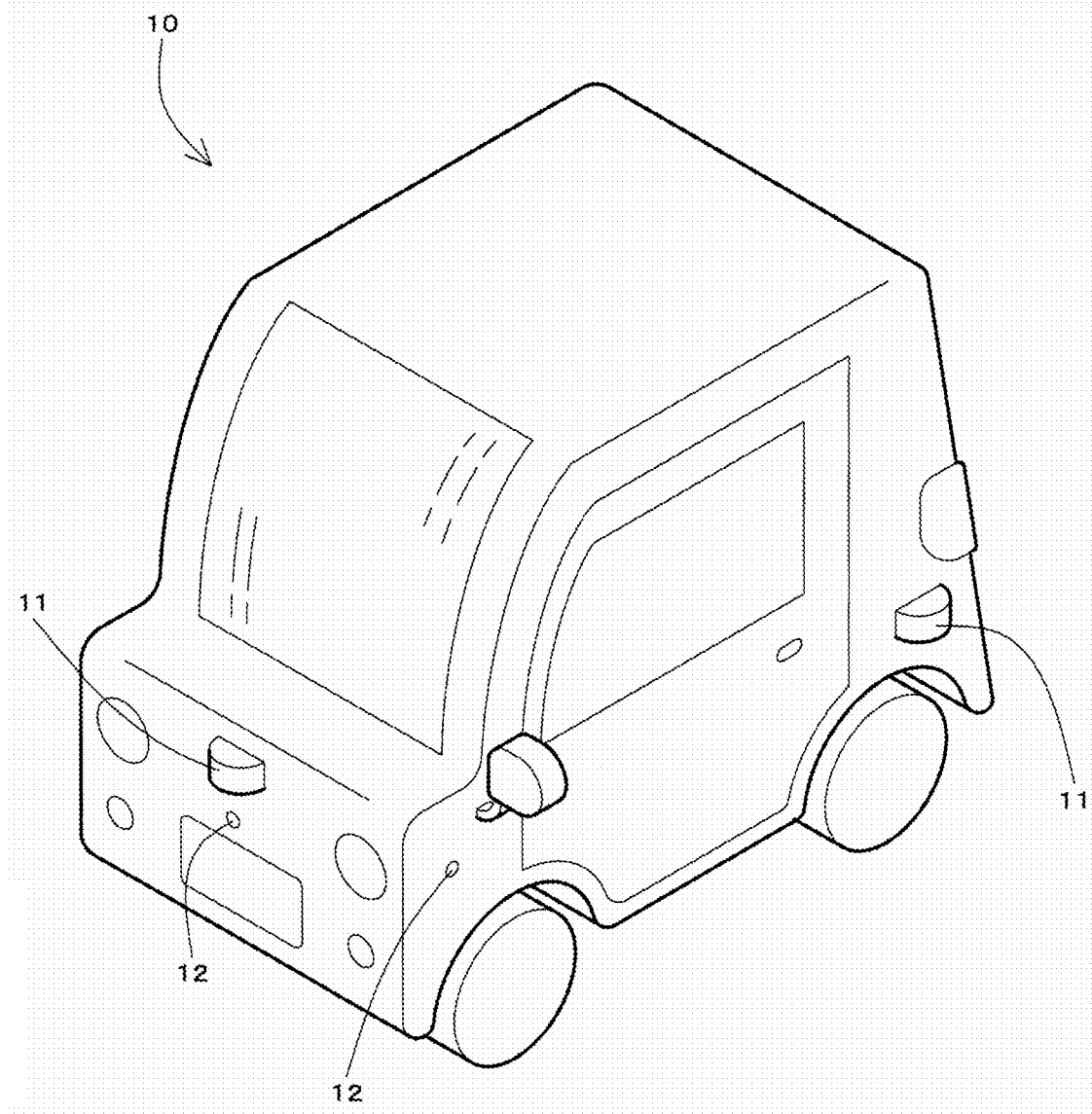
FIG. 2 is a perspective view of an exemplary autonomous driving vehicle according to this embodiment.

FIG. 2 illustrates an exemplary external appearance of the autonomous driving vehicle 10. For example, the autonomous driving vehicle 10 is a small vehicle referred to as a personal mobility vehicle or a micro-mobility vehicle with a capacity of one or two passengers.

The autonomous driving vehicle 10 is used, for example, for a car sharing service. According to such a service, a plurality of users are registered as members, and the members commonly use the autonomous driving vehicles 10. Each user is charged for use, for example, based on the time of use of the autonomous driving vehicles 10.

In use of the car sharing service, an autonomous driving vehicle 10 can come up to a user with autonomous driving, as will be described later, and after driving the user to a destination, can drive back to a predetermined waiting place with autonomous driving. In view of the above, this car sharing service can be rephrased as a driverless taxi service.

The autonomous driving vehicle 10 is capable of autonomous driving, for example, at level 4 or 5 of the autonomous driving levels defined by Society of Automotive Engineers, Inc., or SAE, in the U.S. A steering mechanism, such as a steering wheel, may be equipped inside the vehicle to enable manual driving by a user on board.

Figure 3:
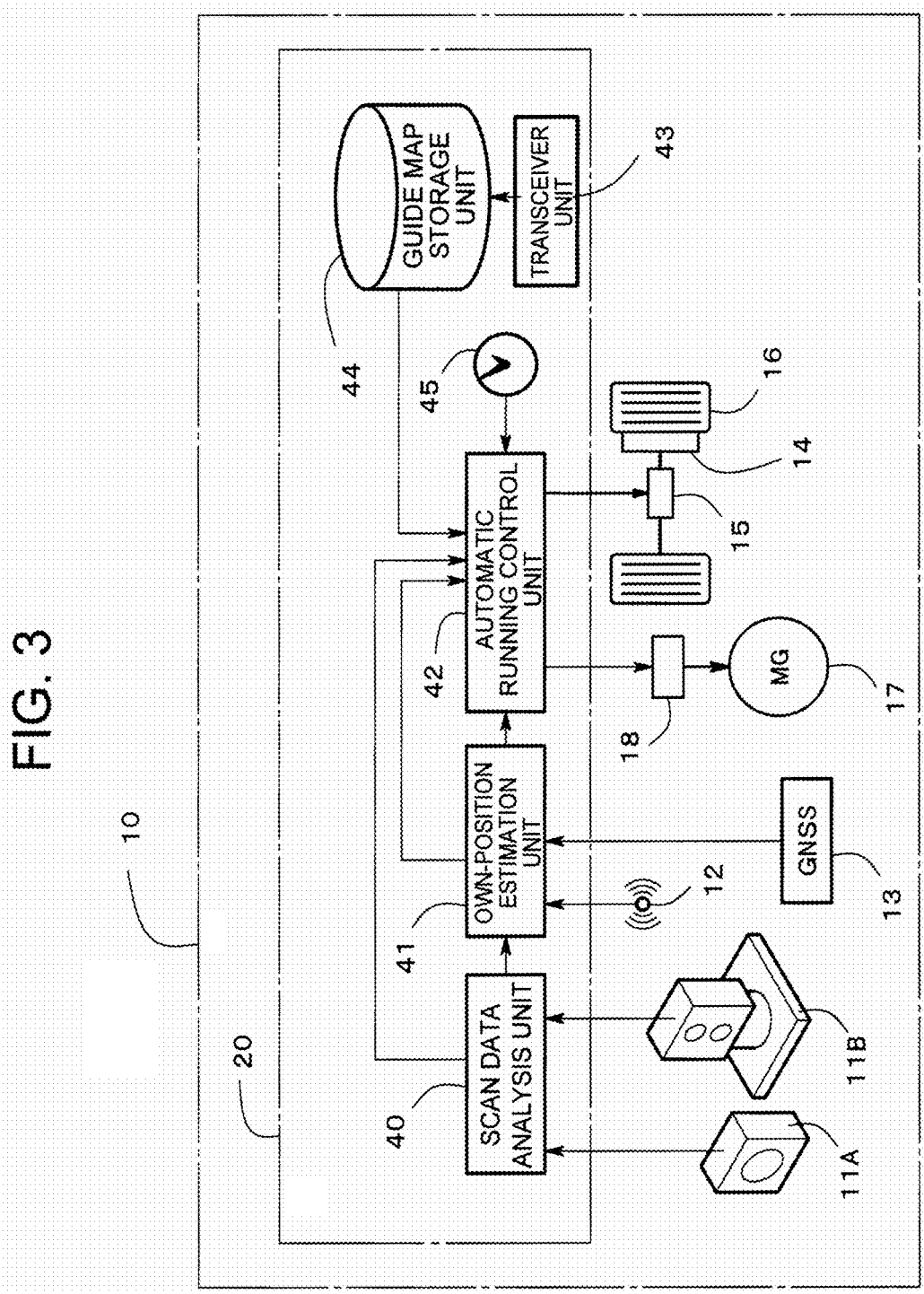
FIG. 3 is a functional block diagram of an autonomous driving vehicle according to this embodiment.

Referring to FIG. 1 to FIG. 3, the autonomous driving vehicle 10 is a battery electric vehicle, or a BEV, having a rotary electric machine 17 (motor) as a driving source and a battery, not illustrated, as a power source. Being a small vehicle with a capacity of one or two passengers, as described above, the autonomous driving vehicle 10 has a limited space for a battery, attributed to the size of the vehicle, and thus a limited range. Hence, the autonomous driving vehicle 10 is used, for example, mainly as a moving vehicle over a short distance within a city or a town.

The autonomous driving vehicle 10 is equipped with a running control mechanism including a steering mechanism 15 to steer the wheels 16 and a brake mechanism 14 to brake the wheels 16. The autonomous driving vehicle 10 is additionally equipped with an inverter 18 for controlling output of the rotary electric machine 17. Further, the autonomous driving vehicle 10 is equipped with a mechanism for enabling running with autonomous driving (also referred to as autonomous running). Specifically, as a mechanism for enabling running with autonomous driving, the autonomous driving vehicle 10 is equipped with a camera 11A, a LiDAR unit 11B, a proximity sensor 12, a positioning unit 13, and a control unit 20.

Referring to FIG. 2, the autonomous driving vehicle 10 has sensor units 11 mounted on its front, rear, and lateral sides, respectively. The sensor unit 11 is composed of the camera 11A (refer to FIG. 1) and the LiDAR unit 11B.

The LiDAR unit 11B is a sensor unit for autonomous driving running, and employs light detection and ranging (LiDAR), that is, a technique for measuring the distance to an object around the vehicle, using a laser beam. The LiDAR unit 11B is composed of an emitter, a receiver, and a motor. The emitter emits an infrared laser beam outwards from the vehicle. The receiver receives the reflected light of the laser beam. The motor rotates the emitter and the receiver.

For example, the emitter emits an infrared laser beam outwards from the vehicle. The laser beam emitted from the emitter hits an object around the autonomous driving vehicle 10, and is reflected back to be received by the receiver. Based on the period of time from emission by the emitter until reception by the receiver, the distance between the reflection point and the receiver is measured. While the motor rotates the emitter and the receiver, the laser beam scans in the horizontal direction and the vertical direction, so that three-dimensional point group data on the environment around the autonomous driving vehicle 10 can be obtained.

Referring to FIG. 1, the camera 11A captures an image of an object in the same field of view as that of the LiDAR unit 11B. The camera 11A includes an image sensor, for example, such as a CMOS sensor or a CCD sensor. The proximity sensor 12 is an infrared sensor, for example, and is mounted on each of the front, rear, and lateral surfaces of the vehicle, as illustrated in FIG. 2. For example, when the autonomous driving vehicle 10 is about to arrive at a boarding place, the proximity sensor 12 detects a projection, such as a curbstone along a sidewalk. The detection enables correct arrival control for having the autonomous driving vehicle 10 stop at a position very close to the curbstone.

The positioning unit 13 is a system for measuring a position, using artificial satellites. For example, a Global Navigation Satellite System (GNSS) is used. The positioning unit 13 enables estimation of the location (latitude and longitude) of the vehicle itself equipped with the positioning unit 13.

The control unit 20 may be, for example, an electronic control unit (ECU) of the autonomous driving vehicle 10, and composed of a computer (an electronic calculator). The control unit 20 has a hardware structure including an input/output controller 21 for controlling input/output of data. Further, the control unit 20 has an operation device including a central processing unit (CPU) 22, a graphics processing unit (GPU) 23, and a deep learning accelerator (DLA) 24. Further, the control unit 20 has a storage unit including a read-only memory (ROM) 25, a random-access memory (RAM) 26, and a hard disk drive (HDD) 27. The hard disk drive 27 may be replaced by a memory device such as a solid state drive (SSD) or the like. These structural components are connected to an internal bus 28.

At least one of the memory devices, namely, the ROM 25 and the hard disk drive 27, stores a program for autonomous driving control of the autonomous driving vehicle 10. The CPU 22 or the like of the control unit 20 executes the program, whereby functional blocks such as those illustrated in FIG. 3 are implemented in the control unit 20. Alternatively, the CPU 22 may execute the above-mentioned program stored in a non-transitory computer readable storage medium, such as a DVD, whereby functional blocks such as those illustrated in FIG. 3 are implemented in the control unit 20. That is, the control unit 20 includes functional blocks including a scan data analysis unit 40, an own-position estimation unit 41, an automatic running control unit 42, a transceiver unit 43, a guide map storage unit 44, and a clock 45.

The scan data analysis unit 40 obtains an image captured with the camera 11A. The scan data analysis unit 40 applies image recognition to the obtained captured image, utilizing the known Single-Shot Multibox Detector (SSD) or You Only Look Once (YOLO) deep learning method with supervised learning. This image recognition enables detection of an object in the captured image, and determination of the attributes (a vehicle, a passenger, a structure, and the like) of the object.

Further, the scan data analysis unit 40 obtains 3D point group data from the LiDAR unit 11B, and executes clustering processing to classify the 3D point groups into two or more clusters. The scan data analysis unit 40 combines the captured image that has been subjected to image recognition and the coordinates of the 3D point group data that has been subjected to clustering, to thereby generate periphery data. Periphery data makes it possible to determine what attribute an object has and how far away from the autonomous driving vehicle 10 that object is located. The periphery data is sent to the own-position estimation unit 41 and the automatic running control unit 42.

The own-position estimation unit 41 obtains own-position information (latitude and longitude) from the positioning unit 13. For example, the own-position estimation unit 41 obtains own-position information from an artificial satellite. The own-position information obtained from an artificial satellite is known to contain an error of approximately 100 m at maximum. To address the above, the own-position estimation unit 41 may correct the own-position information obtained from the positioning unit 13. Specifically, for example, the own-position estimation unit 41 obtains dynamic map (to be described later) data of the peripheral area of the own-position, stored in the guide map storage unit 44, and executes matching of 3D images based on the dynamic map and the peripheral image obtained by the scan data analysis unit 40 to obtain coordinate points of the position, or the own-position, where the autonomous driving vehicle 10 is currently located on the dynamic map. The thus obtained own-position information (self-vehicle position information) is sent to the automatic running control unit 42.

The transceiver 43 receives guide map data from the management device 50. The guide map data contains dynamic map data and running route information, as will be described later. The guide map data received by the transceiver unit 43 is stored in the guide map storage unit 44.

The automatic running control unit 42 executes running control of the autonomous driving vehicle 10, based on the guide map data stored in the guide map storage unit 44, the own-position information (-vehicle position information) sent from the own-position estimation unit 41, and the periphery data sent from the scan data analysis unit 40.

For example, a large-scale course is determined along the own-position and the running route contained in the guide map data. Then, a local course is determined, based on the periphery data, for example, to avoid obstacles ahead on the large-scale course. The automatic running control unit 42 controls the brake mechanism 14, the steering mechanism 15, and the inverter 18 while the vehicle runs along these courses.

<Portable Terminal>

Referring to FIG. 1, the portable terminal 30 is a communication terminal device possessed by a user of the transportation service managed by the management device 50 and utilizing the autonomous driving vehicles 10. The portable terminal 30 may be a smartphone, for example. FIG. 1 illustrates an exemplary hardware structure of the portable terminal 30. The portable terminal 30 includes an input/output controller 31, a CPU 32, an input unit 33, a display unit 34, and a positioning unit 38. In addition, the portable terminal 30 includes a storage unit including a ROM 35, a RAM 36, and a storage unit 37. These structural components are connected to an internal bus 39.

The input unit 33 and the display unit 34 may be integrally formed in the form of a touch panel. The input unit 33 enables input of a destination, a boarding place, the date of use, and a scheduled boarding time when a user is reserving dispatch of an autonomous driving vehicle 10, as will be described later.

The positioning unit 38 can obtain the terminal position, or the current location of the positioning unit 38 itself. For example, the positioning unit 38 is a system for measuring positions, utilizing artificial satellites, similar to the positioning unit 13 of the autonomous driving vehicle 10. For example, a Global navigation Satellite System (GNSS) is used.

At least one of the memory devices, namely, the ROM 35 and the storage unit 37, stores a program for utilizing a vehicle dispatch reservation service for autonomous driving vehicles 10. The program is executed by the CPU 32, or the like, of the portable terminal 30, whereby functional blocks such as those illustrated in FIG. 4 are implemented in the portable terminal 30. Alternatively, the CPU 32 may execute the above-mentioned program stored in a non-transitory computer readable storage medium, such as a DVD, whereby functional blocks such as those illustrated in FIG. 4 may be implemented. That is, the portable terminal 30 includes functional blocks including a transceiver unit 70 and a vehicle dispatch reservation application 71.

The vehicle dispatch reservation application 71 controls image display on the display unit 34, and processes the information inputted from the input unit 33, as will be described later. The vehicle dispatch reservation application 71 displays a vehicle dispatch reservation screen, such as is illustrated in FIG. 6 to FIG. 13, or the like, on the display unit 34 (in the form of a touch panel). A user who owns the portable terminal 30 taps any point on the vehicle dispatch reservation screen, which functions as the input unit 33 as well, to reserve dispatch of an autonomous driving vehicle 10. A process for vehicle dispatch reservation will be described later.

<Contracted Facility Terminal>

Referring to FIG. 1, the contracted facility terminal 80 is installed in a company which operates a contracted facility that provides its parking lot to be used as a waiting place for an autonomous driving vehicles 10 in a waiting time period, or a time period before the scheduled boarding time. For example, the company may be an operating company which operates and manages a plurality of commercial facilities having respective adjoining parking lots.

Examples of commercial facilities include convenience stores. Examples of operating companies include headquarter companies (franchisor) having convenience stores as member stores (franchisees). That is, in this example, a parking lot adjoining a convenience store is assigned as a waiting place where an autonomous driving vehicle 10 waits before the scheduled boarding time. In another example, the commercial facilities may be so-called chain stores having respective adjoining parking lots, and the operating company may be a headquarter company that operates and manages these chain stores.

In exchange for leasing a part of the parking lot of a commercial facility to be used as a waiting place for an autonomous driving vehicle 10, preferential service information, for example, on a discount service for products handled at the commercial facility is sent from the contracted facility terminal 80 to the management device 50, as will be described later. The provided preferential service information is then sent to the portable terminal 30 of the user. That is, providing preferential service encourages a user having reserved dispatch of the autonomous driving vehicle 10 that is waiting in the parking lot of the commercial facility to shop at the commercial facility before they board the vehicle.

As described above, providing preferential services can attract users of the autonomous driving vehicles 10 as potential purchasers at the commercial facilities. This scheme can provoke active motivation of a commercial facility to lease a part of its adjoining parking lot to be used as a waiting place for an autonomous driving vehicle 10, in other words, as a vehicle dispatch center.

Besides the preferential service, advertisement information on products handled in the commercial facility is sent from the contracted facility terminal 80 via the management device 50 to the portable terminal 30 of the user. Note that in leasing the parking lot of a commercial facility to be used as a waiting place for an autonomous driving vehicle 10, a parking fee is calculated based on the waiting time, and the company where the management device 50 is installed (the provider company of the car sharing service) pays the parking fee to the company where the contracted facility terminal 80 is installed (the headquarter company of the commercial facility). In payment, the parking fee is discounted in exchange for providing advertisement information to a user.

The contracted facility terminal 80 is composed of a computer (an electronic calculator), for example. Referring to FIG. 1, the contracted facility terminal 80 has a hardware structure composed of an input/output controller 81, a CPU 82, an input unit 83, and a display unit 84. Further, the contracted facility terminal 80 has a storage unit including a ROM 85, a RAM 86, and a hard disk drive 87 (HDD). These structural components are connected to an internal bus 88.

For example, an operator who operates the contracted facility terminal 80, such as an employee of the headquarter company of the commercial facility, inputs product advertisement data and preferential service data via the input unit 83. The inputted product advertisement data and preferential service data are sent via the management device 50 to the portable terminal 30 of the user.

<Management Device>

The management device 50 of an autonomous driving vehicle is installed, for example, in a company that provides the car sharing service utilizing autonomous driving vehicles 10.

The management device 50 is composed of, for example, a computer (an electronic calculator). As illustrated in FIG. 1, the management device 50 has a hardware structure composed of an input/output controller 51, a CPU 52, an input unit 53, and a display unit 54. Further, the management device 50 has a storage unit including a ROM 55, a RAM 56, and a hard disk drive 57 (HDD). These structural components are connected to an internal bus 58.

At least one of the memory devices, namely, the ROM 55 and the HDD 57, stores an operation program for the car sharing service utilizing the autonomous driving vehicles 10. The program is executed by the CPU 52 or the like of the management device 50, whereby functional blocks such as those illustrated in FIG. 4 are implemented in the management device 50. Alternatively, the CPU 52 may execute the above-mentioned program stored in a non-transitory computer readable storage medium, such as a DVD, whereby functional blocks such as those illustrated in FIG. 4 are implemented.

That is, the management device 50 includes functional blocks including a service granting unit 60, a congestion rate calculation unit 61, a transceiver unit 62, a guide map generation unit 63, a clock 64, a usage fee calculation unit 65, a parking fee calculation unit 66, a vehicle dispatch reservation setting unit 67, and a waiting place setting unit 68. Further, the management device 50 has a storage unit including a contracted facility information storage unit 69A, a user information storage unit 69B, a map information storage unit 69C, and a vehicle dispatch schedule storage unit 69D.

The contracted facility information storage unit 69A stores information concerning a plurality of commercial facilities that provide their parking lots to be used as waiting places for the autonomous driving vehicles 10. This information includes, for example, the name, address, and accumulated parking time of each commercial facility, and the number of vehicles which the parking lot of the commercial facility can accommodate.

The user information storage unit 69B stores information concerning users of the car sharing service utilizing the autonomous driving vehicles 10. The information includes the name, account name, history of use, address, contact, driver's license number, credit card number, and password to log in the vehicle dispatch reservation application 71 of a user. Note that the account name is a name (a member name) to specify a user when using the vehicle dispatch reservation application 71, and that, for example, a mail address of the user is used as the account name.

The map information storage unit 69C stores dynamic map data, or map data. A dynamic map is a 3D map, and shows the positions and shapes (3D shapes) of roads, for example. The 3D shape of a road includes, for example, the gradient and width of the road. The dynamic map also shows, for example, the positions of lanes, crosswalks, stop lines or the like, drawn on the roads. Further, the dynamic map shows the positions and shapes (3D shapes) of buildings and constructions such as signals peripheral to the roads. Further, the dynamic map shows the positions and shapes of parking lots.

For example, the dynamic map utilizes a geographical coordinate system including latitude and longitude. In a case where the autonomous driving vehicle 10 runs with autonomous driving, the guide map generation unit 63 extracts dynamic map data from the map information storage unit 69C. The guide map generation unit 63 then generates guide map data containing a running route for the autonomous driving vehicle 10, and sends the guide map data to the autonomous driving vehicle 10. The running route is a route passing through the waiting place, the boarding place, and the destination.

The dynamic map data stored in the map information storage unit 69C is processed by the guide map generation unit 63. Specifically, upon activation of the vehicle dispatch reservation application 71, the guide map generation unit 63 generates a map image 100, or a plane map image covering the peripheral area of the portable terminal 30 (refer to FIG. 6), as will be described later.

The vehicle dispatch schedule storage unit 69D stores vehicle dispatch reservation schedule information for a plurality of autonomous driving vehicles 10 managed by the management device 50. Vehicle dispatch reservation schedule contains the identification number (ID) of an autonomous driving vehicle reserved for dispatch, the account name of a user having reserved vehicle dispatch, a date of use, a scheduled boarding time, a boarding place, and a destination.

The service granting unit 60 receives the preferential service information and advertisement information sent from the contracted facility terminal 80, and forwards the preferential service information and the advertisement information to a user having set the parking lot of the commercial facility as a boarding place when reserving vehicle dispatch.

The congestion rate calculation unit 61 determines the congestion rate of the parking lot of each of the plurality of contracted commercial facilities. Specifically, the congestion rate calculation unit 61 calculates the congestion rate of a parking lot, based on a captured image received from the monitoring camera 90 installed in the parking lot. For example, the congestion rate calculation unit 61 has a neural network trained with training data including a vehicle image as an input value and a "vehicle" as an output value (a correct value).

The usage fee calculation unit 65 calculates the time of use of autonomous driving vehicles 10 for every user. For example, the usage fee calculation unit 65 calculates the total time of use of the autonomous driving vehicles 10 for every month, and calculates a corresponding usage fee. The calculated usage fee is charged to the user.

The parking fee calculation unit 66 calculates a parking fee, based on the period of time (a waiting time) during which the autonomous driving vehicles 10 have used the parking lot adjoining a commercial facility as a waiting place. For example, the total waiting time for each of all the autonomous driving vehicles 10 managed by the management device 50 is calculated for every month, and a parking fee is calculated based on the calculated waiting time. Note that in a case where advertisement information provided from the contracted facility terminal 80 has been sent to the portable terminal 30, the parking fee is discounted in accordance with the number of times the advertisement information has been provided, as described above.

In response to a request from a user, the vehicle dispatch reservation setting unit 67 reserves dispatch of an autonomous driving vehicle 10, as will be described later in detail.

The waiting place setting unit 68 sets a waiting place for a waiting time period, or a time period before a schedule boarding time, with respect to an autonomous driving vehicle 10 reserved for dispatch, as will be described later in detail. In addition, the waiting place setting unit 68 sets a waiting place for prospective vehicle dispatch. That is, the waiting place setting unit 68 sets a waiting place where an autonomous driving vehicle 10 not reserved for dispatch, or in a vacant state, parks to wait in an area where designation of a boarding place is made with high frequency.

<Monitoring camera>

Figure 5:
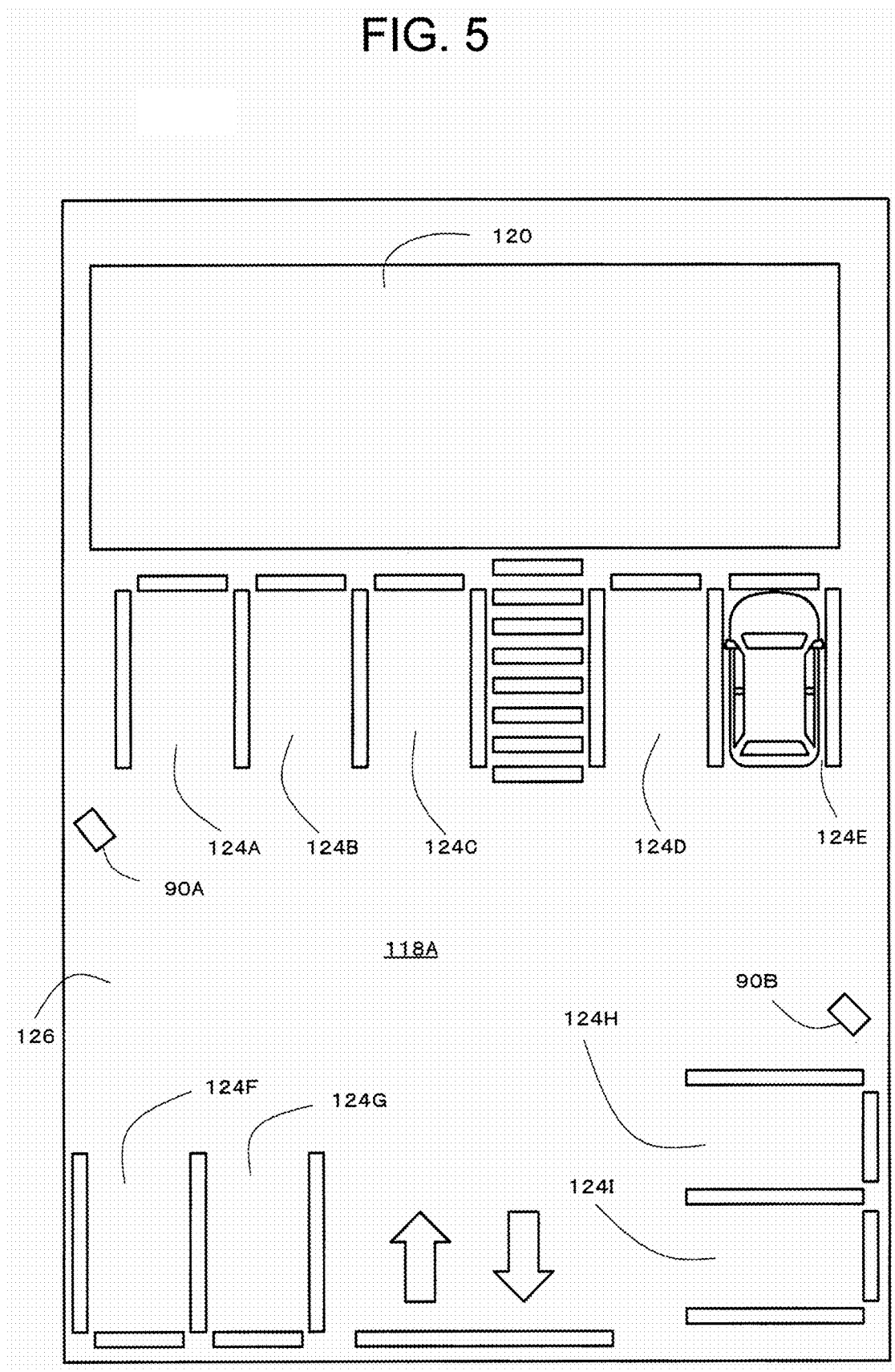
FIG. 5 is a plan view of a contracted shop and an adjoining parking lot.

FIG. 5 is a plan view of a neighbor parking lot 118A (refer to FIG. 11, a parking lot located closest to a boarding place), as will be described later, and a commercial facility 120 (refer to FIG. 5) adjoining the neighbor parking lot 118A. The monitoring camera 90 monitors the parking lot 118A. Two or more monitoring cameras 90 may be installed in a single parking lot 118A to capture an image of the entire parking lot 118A, as illustrated as monitoring cameras 90A, 90B in FIG. 5.

Referring to FIG. 1, the monitoring camera 90 includes an image sensor, such as, for example, a CMOS sensor or a CCD sensor. The monitoring camera 90 intermittently captures an image of the parking lot 118A at intervals of five minutes or ten minutes, for example. Images captured with the monitoring camera 90 are sent to the management device 50.

<Vehicle Dispatch Reservation>

Referring to FIG. 4, when a user activates the vehicle dispatch reservation application 71 installed in the portable terminal 30, an input form, not illustrated, appears on the display unit 34 to enable input of an account name and a password. Once an account name and a password are inputted, the inputted information is sent to the vehicle dispatch reservation setting unit 67 via the transceiver units 62, 70.

The vehicle dispatch reservation setting unit 67 verifies the received account name and password information with respective corresponding information items stored in the user information storage unit 69B. When the verification is duly completed, the vehicle dispatch reservation setting unit 67 obtains the current location (the terminal position) from the positioning unit 38 of the portable terminal 30. Further, the guide map generation unit 63 obtains plane map data on the peripheral area of the terminal position from the map information storage unit 69C, and forwards the data to the portable terminal 30.

Figure 6:
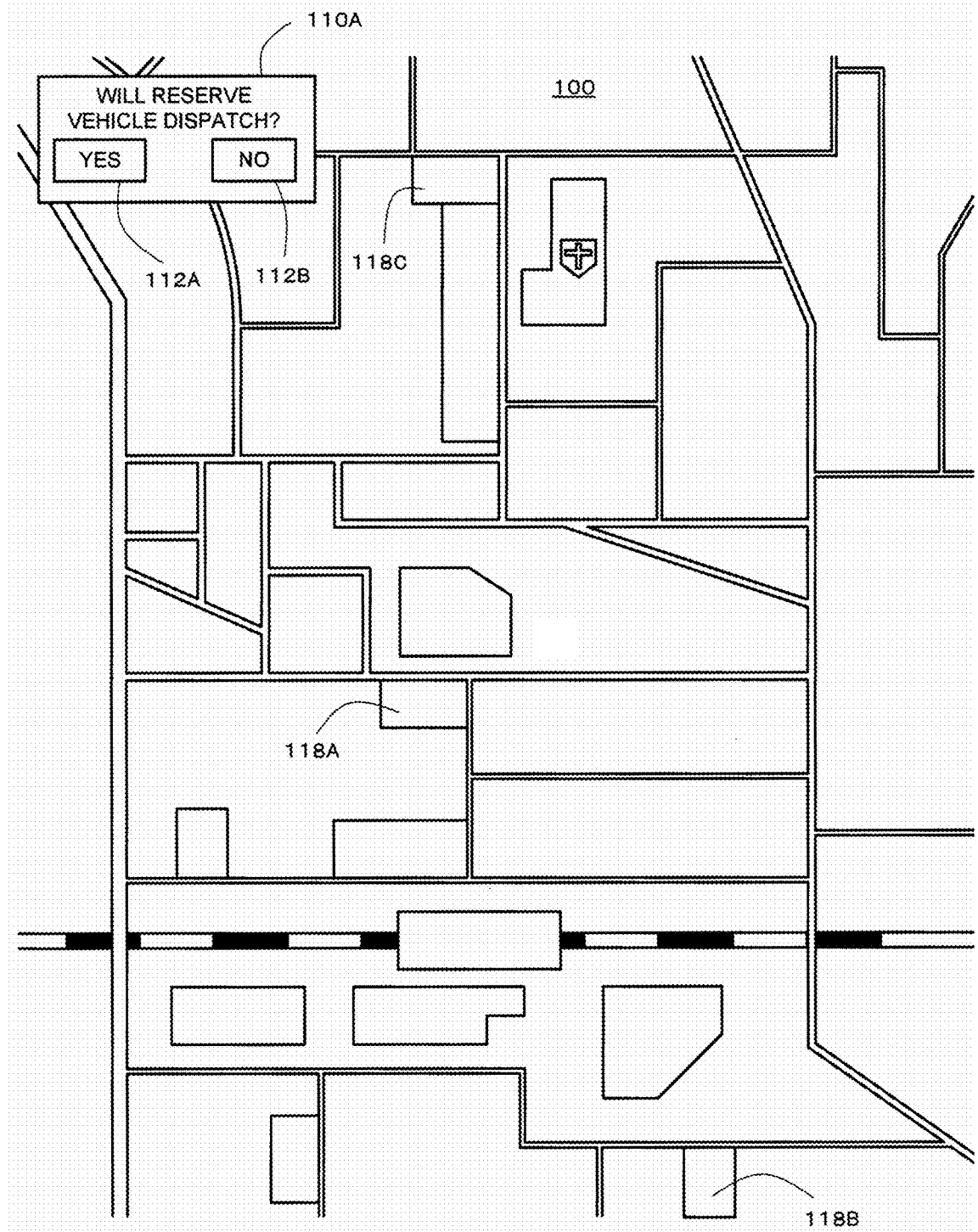
FIG. 6 explains a process for vehicle dispatch reservation to be executed upon activation of a vehicle dispatch reservation application (1/8), illustrating an inquiry screen for vehicle dispatch reservation.

On the display unit 34 of the portable terminal 30, a vehicle dispatch reservation image illustrated in FIG. 6 is displayed. Specifically, the image contains a message box 110A superimposed on the map image 100 of the peripheral area of the terminal position. The message box 110A contains operation buttons 112A, 112B ("YES", "NO") which are used to answer a question asking whether to reserve dispatch of an autonomous driving vehicle 10.

Figure 7:
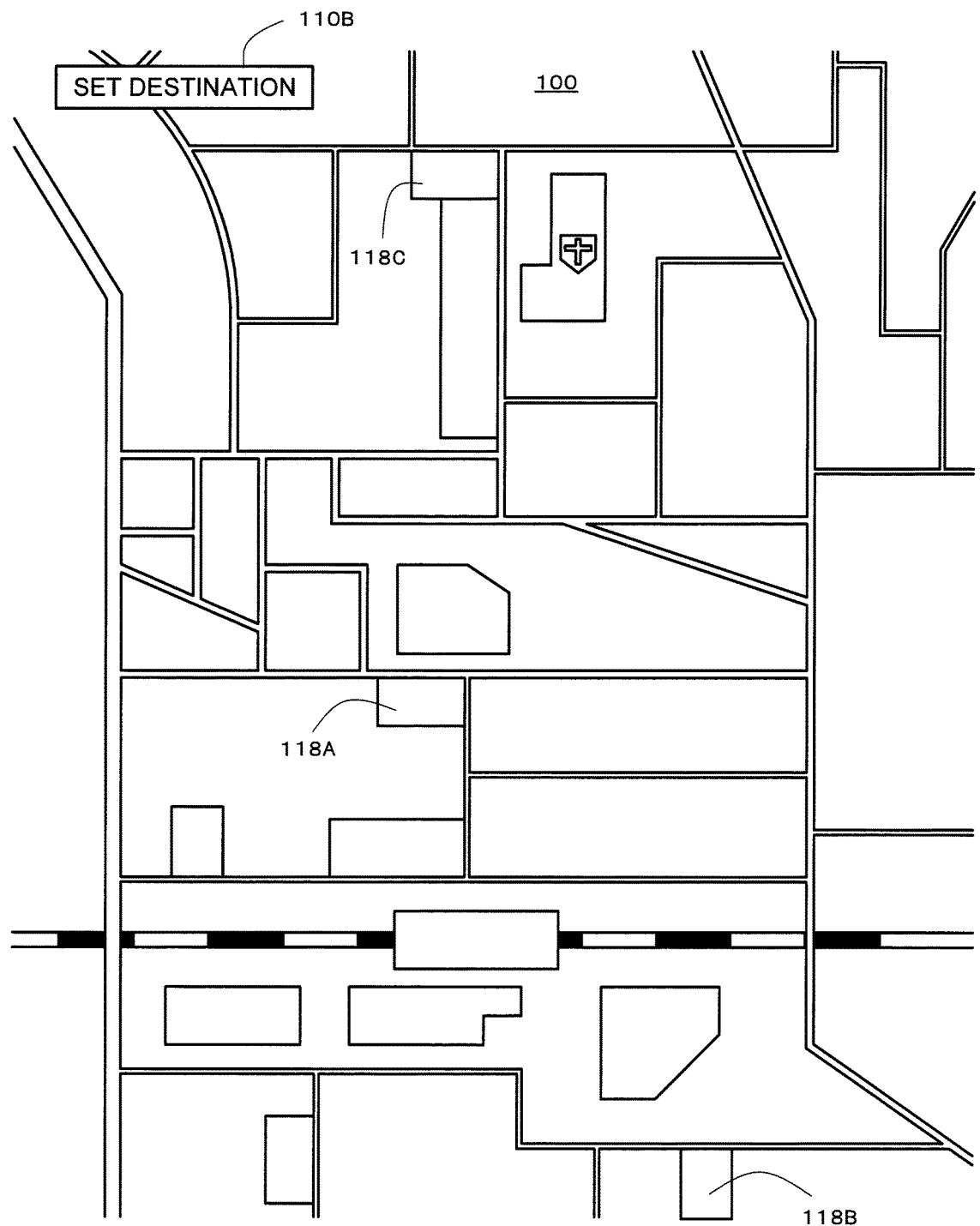
FIG. 7 explains a process for vehicle dispatch reservation to be executed upon activation of a vehicle dispatch reservation application (2/8), illustrating a destination setting screen.
Figure 8:
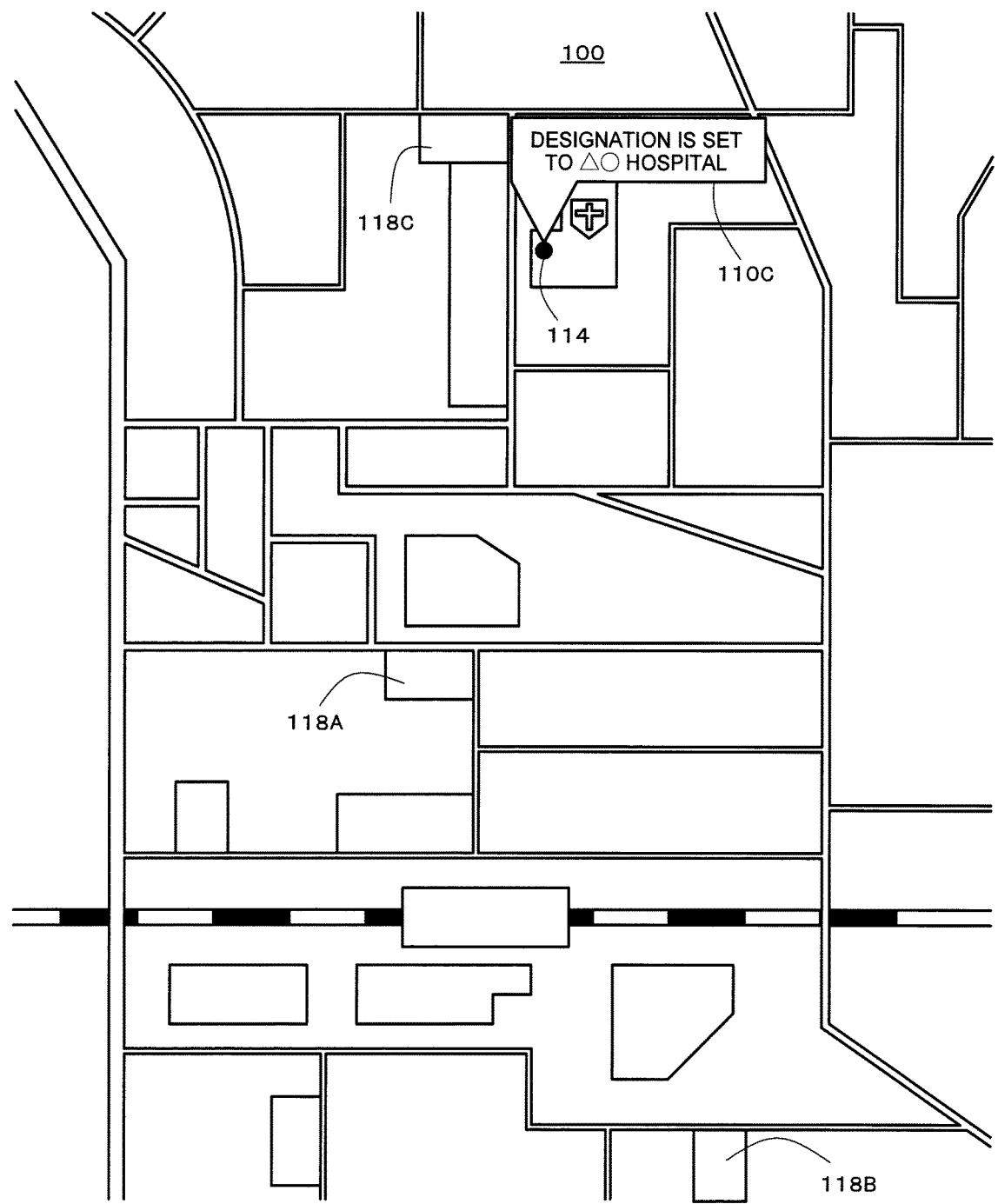
FIG. 8 explains a process for vehicle dispatch reservation to be executed upon activation of a vehicle dispatch reservation application (3/8), illustrating a destination setting confirmation screen.

When a user selects the operation button 112A with a tapping operation or the like, a message box 110B to prompt for setting of a destination is displayed on the display unit 34, as illustrated in FIG. 7. When a user then designates any point on the map image 100 with a tapping operation or the like, a designation mark 114 is attached to the designated point, as illustrated in FIG. 8, and a message box 110C to confirm the designation setting is displayed.

Figure 9:
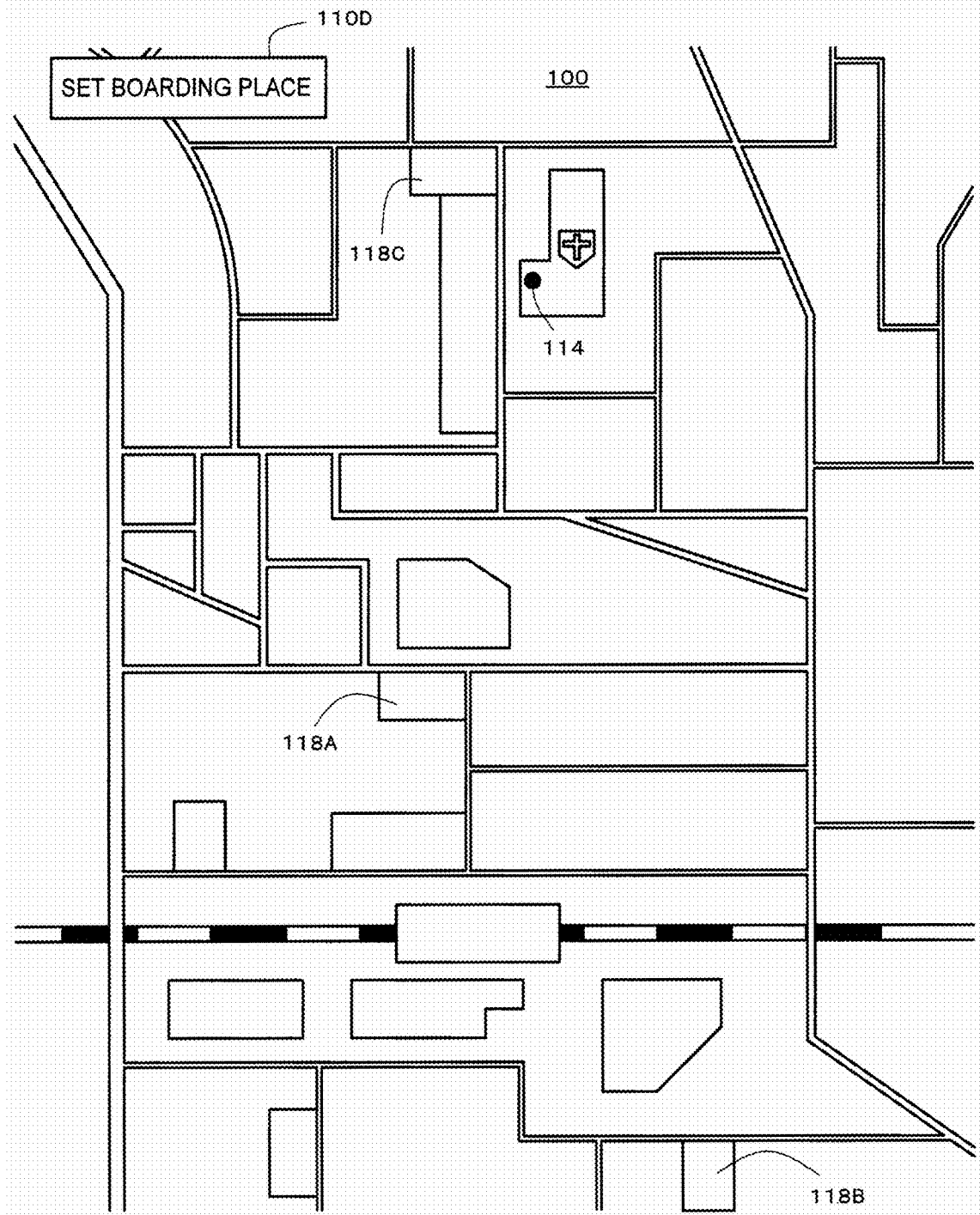
FIG. 9 explains a process for vehicle dispatch reservation to be executed upon activation of a vehicle dispatch reservation application (4/8), illustrating a boarding place setting screen.
Figure 10:
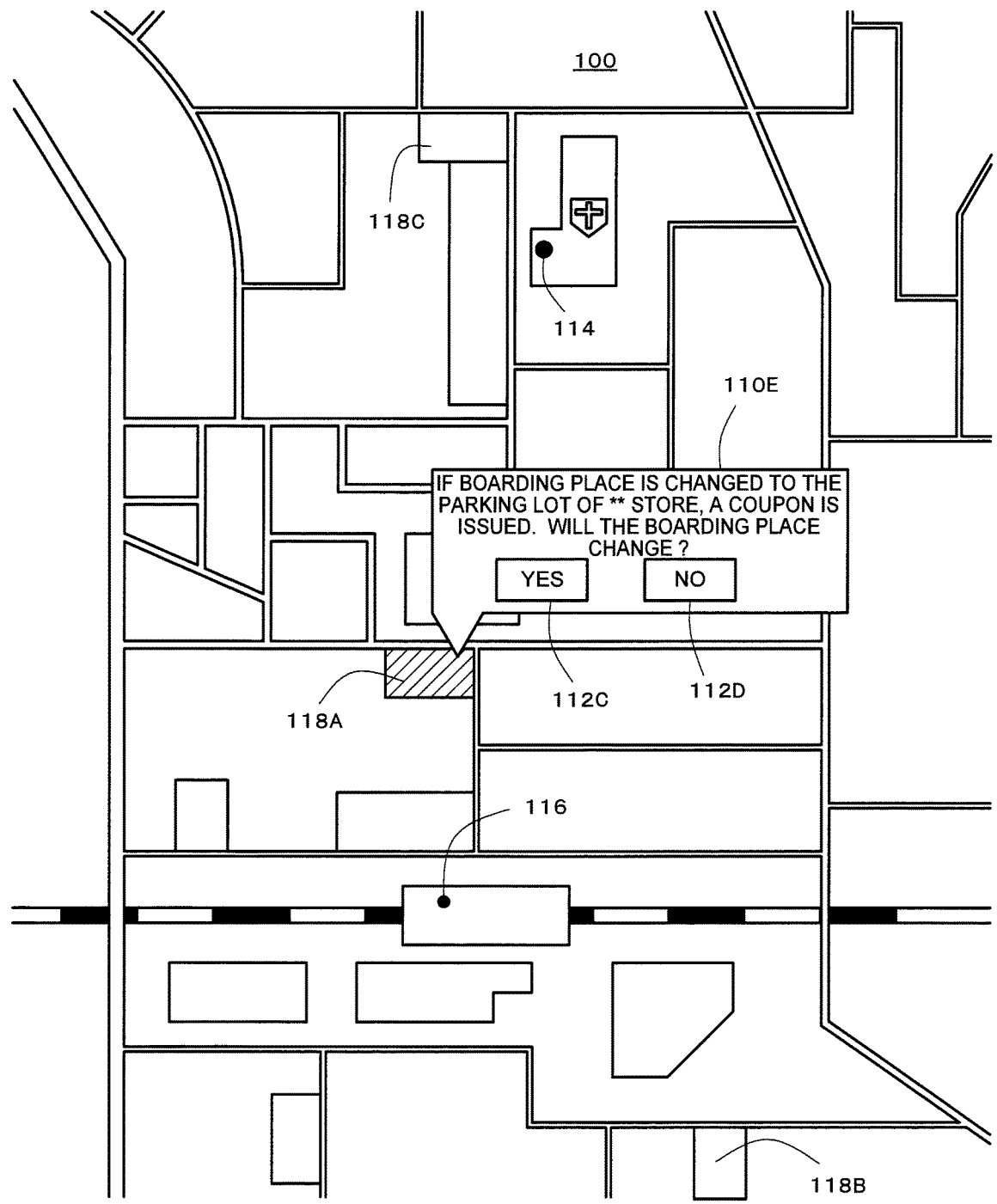
FIG. 10 explains a process for vehicle dispatch reservation to be executed upon activation of a vehicle dispatch reservation application (5/8), illustrating a screen showing a message to suggest change of a boarding place.

After the designation setting, a message box 110D to prompt for setting of a boarding place is displayed on the display unit 34, as illustrated in FIG. 9. When the user then designates any point on the map image 100 with a tapping operation or the like, a boarding place mark 116 is displayed in the designated point, as illustrated in FIG. 10.

Then, the vehicle dispatch reservation setting unit 67 determines whether the boarding place mark 116 is set to any of the parking lots 118A to 118C of the respective commercial facilities that provide places where the autonomous driving vehicle 10 is to wait. In a case where the boarding place designated by the user is different from any of the parking lots 118A to 118C of the commercial facilities, the vehicle dispatch reservation setting unit 67 sends a suggestion message to the user to suggest change of the boarding place to the parking lot 118A in the neighborhood of the designated boarding place mark 116. Upon receipt of the message, a message box 110E is displayed on the display unit 34 of the portable terminal 30. The message box 110E contains a suggestion message and operation buttons 112C, 112D ("YES", "NO") which are used to answer whether to accept the suggestion.

Specifically, the suggestion message contains a message to the effect that, if the boarding place is changed to the parking lot 118A, or a suggested parking lot, a preferential service usable in the commercial facility 120 adjoining the parking lot 118A (refer to FIG. 5) is granted. That is, the user is encouraged to change the boarding place by being tempted with the preferential service.

Figure 11:
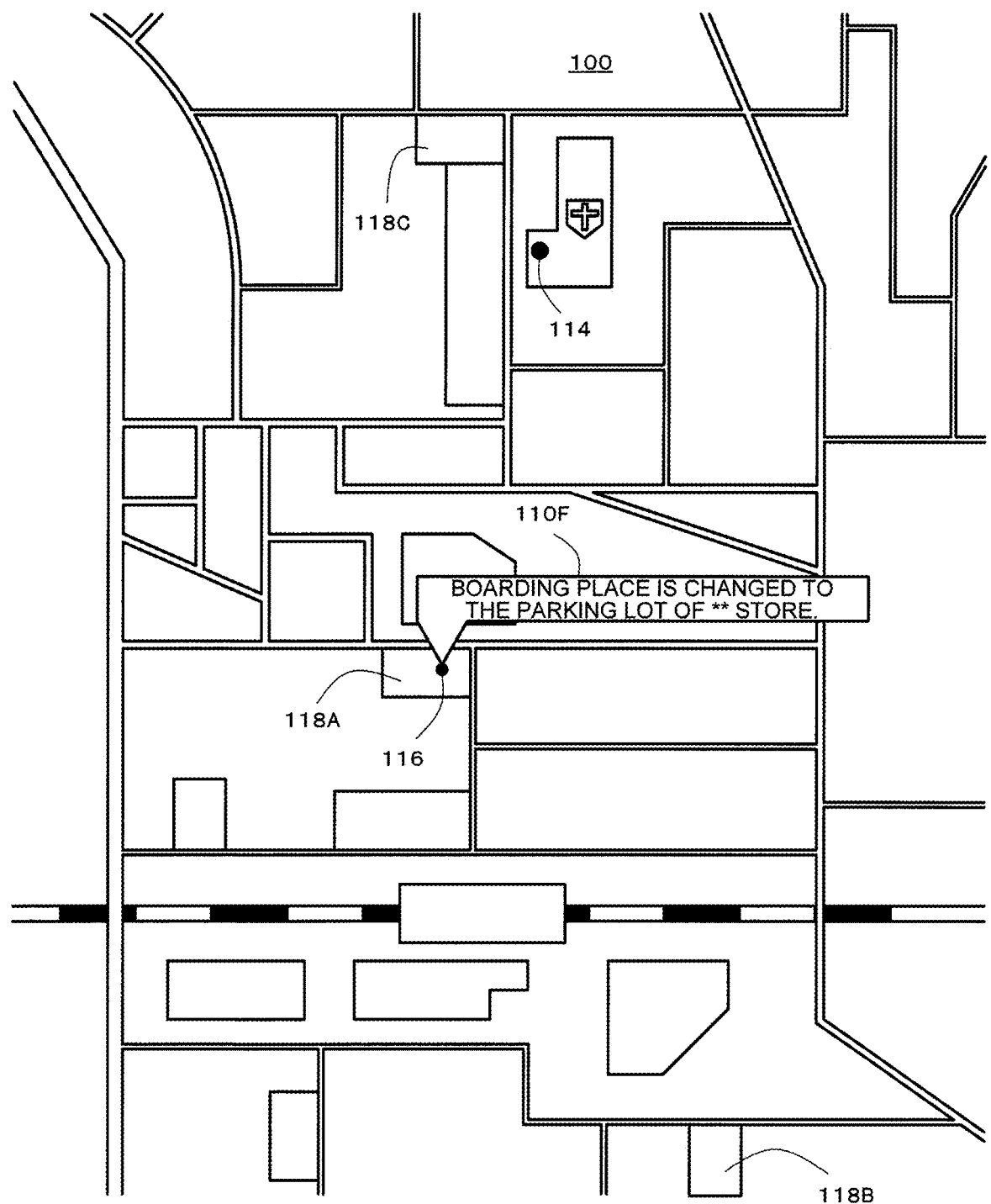
FIG. 11 explains a process for vehicle dispatch reservation to be executed upon activation of a vehicle dispatch reservation application (6/8), illustrating a boarding place change confirmation screen.

When the user selects the operation button 112C with a tapping operation or the like, the boarding place mark 116 is attached to the parking lot 118A, or the suggested parking lot, as illustrated in FIG. 11, and a message box 110F containing a confirmation message is displayed on the display unit 34. Then, the service granting unit 60 of the management device 50 sends preferential service information usable in the commercial facility 120 adjoining the parking lot 118A and advertisement information concerning the commercial facility to the portable terminal 30.

On other hand, when the operation button 112D ("NO") illustrated in FIG. 10 is selected, a boarding place is set with the initially designated boarding place mark 116. In this case, preferential service information is not sent, but the advertisement information alone is sent to the portable terminal 30. Alternatively, preferential service information on a service less beneficial for the user than the preferential service that would have been granted upon change of the boarding place may be sent to the portable terminal 30.

With the destination and the boarding place set, the guide map generation unit 63 generates a running route from the boarding place to the destination. Further, the guide map generation unit 63 calculates a scheduled running time, based on expected traffic congestion on the running route and the rated vehicle speed or the like of the autonomous driving vehicle 10.

Figure 12:
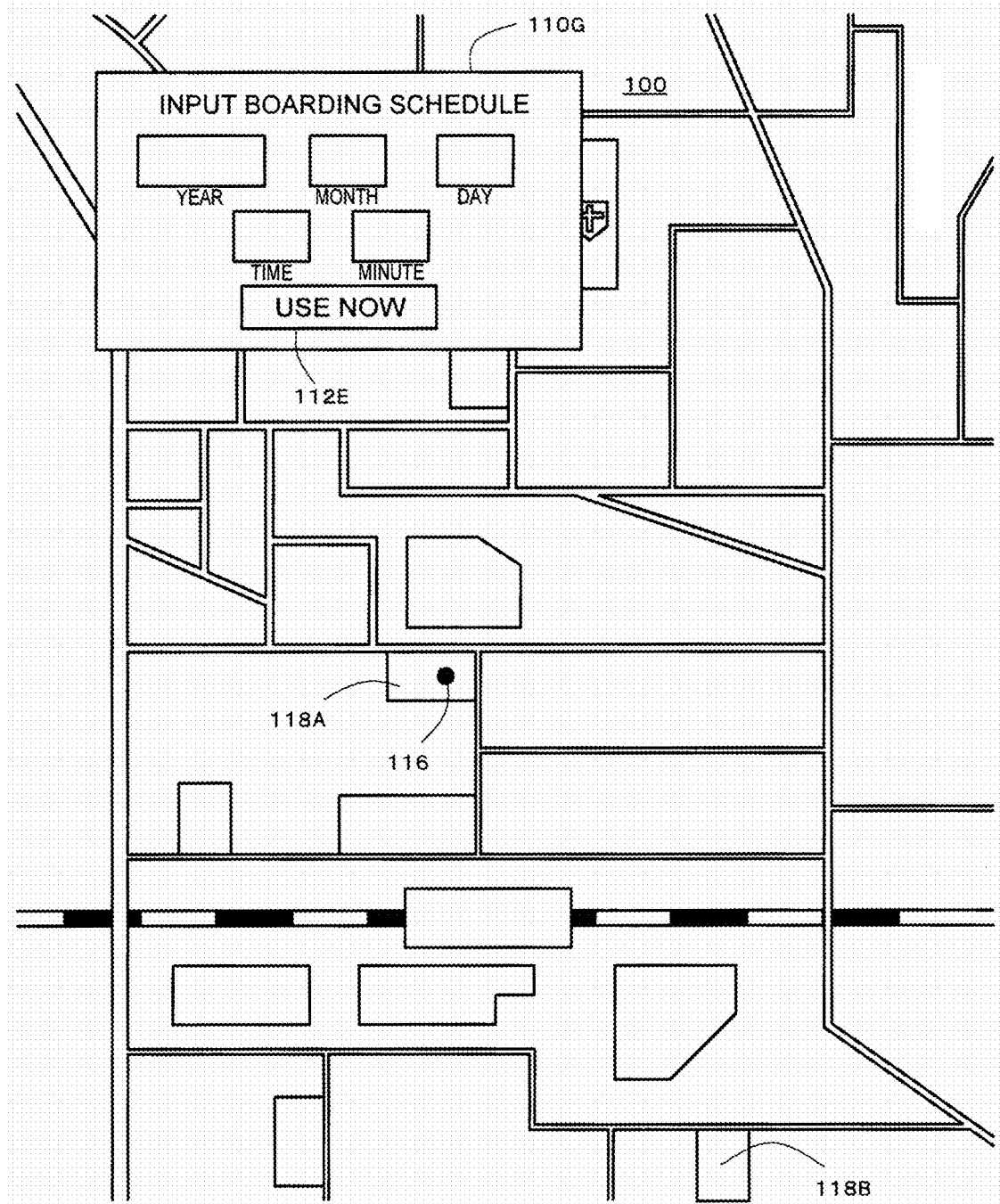
FIG. 12 explains a process for vehicle dispatch reservation to be executed upon activation of a vehicle dispatch reservation application (7/8), illustrating a scheduled boarding time and date setting screen.

Thereafter, referring to FIG. 12, a message box 110G is displayed on the display unit 34 to enable input of a boarding schedule. The message box 110G enables input of the date of use and a scheduled boarding time. Further, in order to accommodate an immediate use of an autonomous driving vehicle 10, an operation button 112E for designation of the current time as a scheduled boarding time is displayed on the message box 110G.

With a boarding schedule inputted by the user, the vehicle dispatch reservation setting unit 67 determines whether any autonomous driving vehicle 10 is available for dispatch, referring to the vehicle dispatch schedule stored in the vehicle dispatch schedule storage unit 69D. For example, the vehicle dispatch reservation setting unit 67 calculates a running time period beginning with the above-described scheduled boarding time as a start and ending at a time after elapse of the above-described scheduled running time. Then, the vehicle dispatch reservation setting unit 67 searches for an autonomous driving vehicle 10 not reserved for dispatch, or in a vacant state, during the running time period and periods of time preceding and subsequent to the running time period, for example, respective periods of time one hour before and after the running time period.

Figure 13:
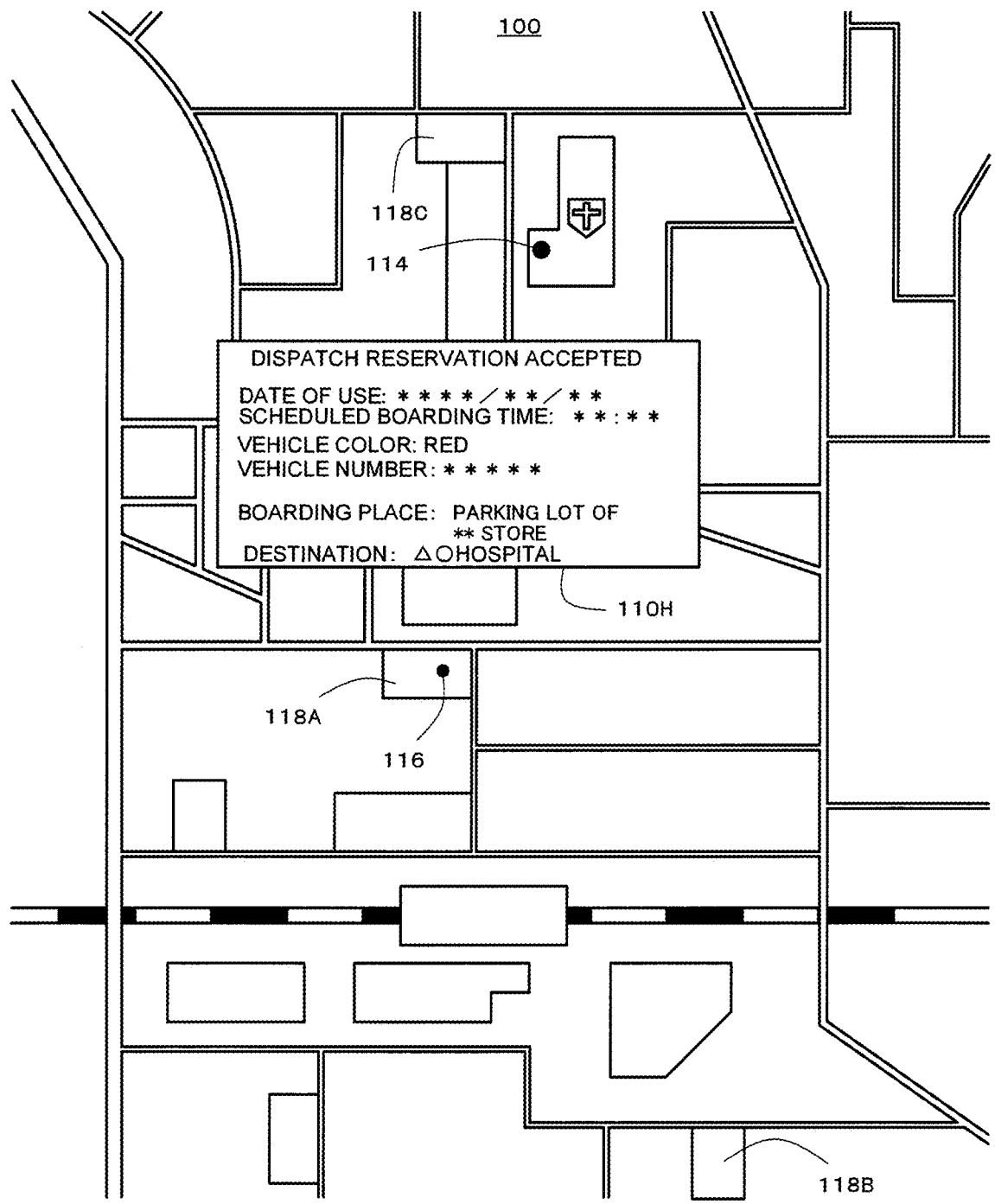
FIG. 13 explain a process for vehicle dispatch reservation to be executed upon activation of a vehicle dispatch reservation application (8/8), illustrating a vehicle dispatch reservation confirmation screen.

With an autonomous driving vehicle 10 in a vacant state found, a message box 110H containing a confirmation message to confirm the vehicle dispatch reservation, as illustrated in FIG. 13, is displayed on the display unit 34. The confirmation message contains the date of use, the scheduled boarding time, the vehicle information, the boarding place, and the destination.

<Process for Waiting place Setting>

The autonomous driving vehicle 10 reserved for dispatch waits in a predetermined parking lot until a little before the scheduled boarding time. Specifically, for example, a plurality of autonomous driving vehicles 10 are parked to wait in a large parking lot in a far suburb of the boarding place, and an autonomous driving vehicle 10 moves to the parking lot of a commercial facility that is a neighbor parking lot in the neighborhood of the boarding place when a waiting time period, before the scheduled boarding time, arrives, and waits there. In the example illustrated in FIG. 11, the neighbor parking lot is the parking lot 118A. In order for the autonomous driving vehicle 10 to wait in the neighbor parking lot 118A, the congestion rate of the neighbor parking lot 118A is calculated in advance. In a case where the congestion rate is sufficiently low, the neighbor parking lot 118A is set as a standby parking lot.

Figure 14:
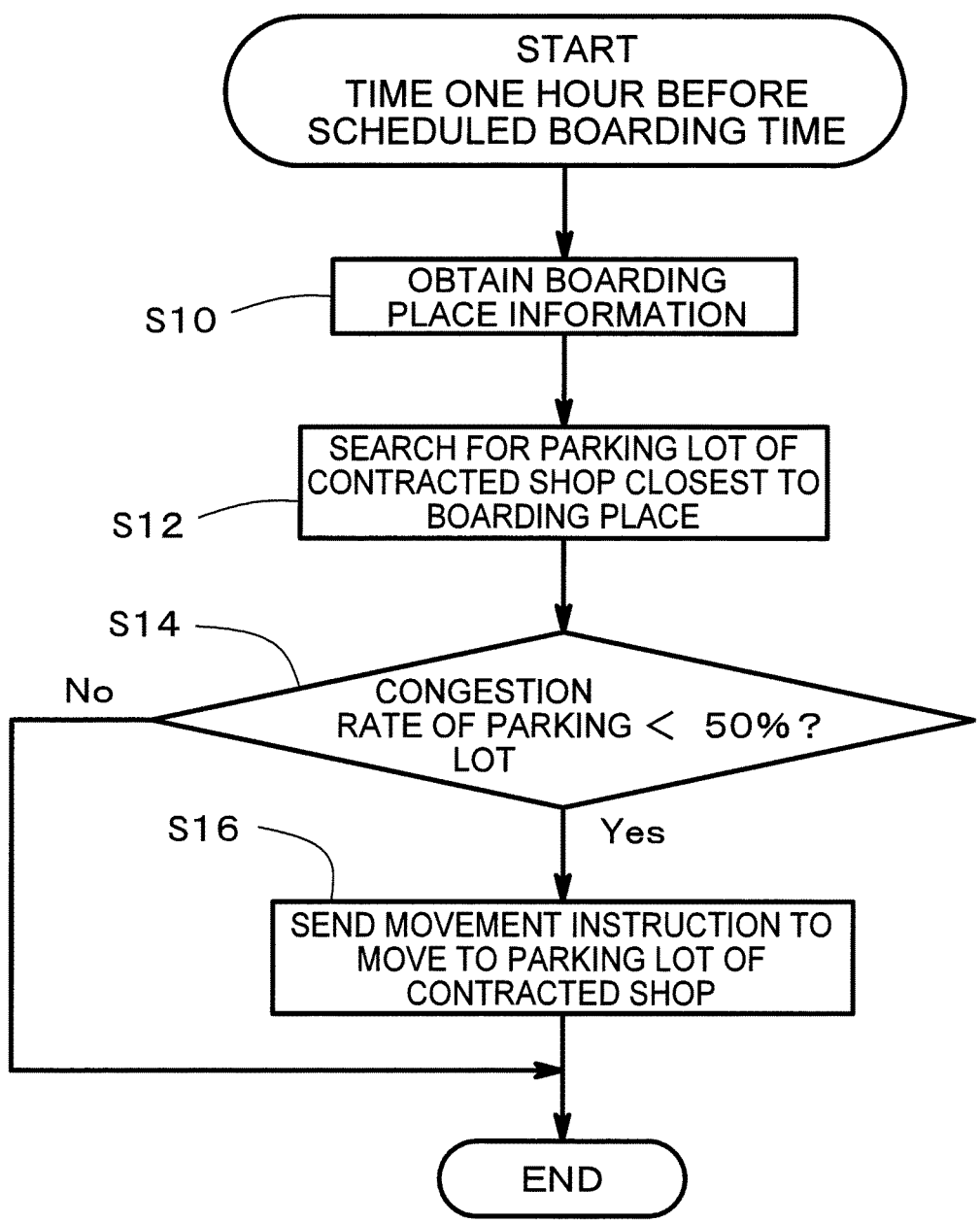
FIG. 14 is a flowchart of setting a waiting place.

Referring to FIG. 4, FIG. 5, and FIG. 14, the waiting place setting unit 68 checks whether there is a vehicle dispatch reservation schedule for which a waiting time period before a scheduled boarding time has arrived, referring to all vehicle dispatch reservation schedules stored in the vehicle dispatch schedule storage unit 69D. Note that a waiting time period may be, for example, a time period one hour before a scheduled boarding time.

Referring to the clock 64, the waiting place setting unit 68 extracts a vehicle dispatch reservation schedule for which waiting time period has arrived, and obtains boarding place information contained in the reservation information (S10 in FIG. 14). The waiting place setting unit 68 then searches for a parking lot (the neighbor parking lot 118A) adjoining a commercial facility that is a contracted shop located closest to the obtained boarding place (S12).

For example, the waiting place setting unit 68 obtains address information of the contracted facilities from the contracted facility information storage unit 69A, and map information from the map information storage unit 69C. Then, the waiting place setting unit 68 obtains a positional relationship between the boarding place and each of the contracted facilities, and selects the parking lot (the neighbor parking lot 118A) adjoining a contracted facility located closest to the boarding place. Note that in a case where the parking lot 118A is set as a boarding place, the above-mentioned positional relationship is not obtained, and the parking lot is simply selected as a neighbor parking lot.

Then, the congestion rate calculation unit 61 obtains a captured image of the selected neighbor parking lot 118A from the monitoring camera 90 (90A, 90B), and calculates the congestion rate of the neighbor parking lot 118A, based on the obtained captured image. Specifically, for example, image recognition of a captured image is executed using a neural network trained with training data including a vehicle image as input data and "vehicle" as an output value (a correct value), as described above. This provides the number of vehicles currently parked in the neighbor parking lot 118A.

The number of vehicles which each of the parking lots 118A to 118C of the respective contracted facilities can accommodate is stored in the contracted facility information storage unit 69A. Dividing the number of vehicles obtained through image recognition by the number of vehicles that can be accommodated leads to a congestion rate [%]. In the example illustrated in FIG. 5, for example, one vehicle is parked (in the parking space 124E), and parking spaces for nine vehicles are vacant (parking spaces 124A to 124D, 124F to 124I are vacant). Hence, the congestion rate is 0.11 (11%).

The waiting place setting unit 68 determines whether the calculated congestion rate is less than a predetermined congestion threshold (S14). Note that a congestion threshold is set to 50%, for example. When the congestion rate is less than the congestion threshold, the waiting place setting unit 68 sets the neighbor parking lot 118A as a waiting place for the autonomous driving vehicle 10 to wait during the waiting time period (a short-time parking place). Then, the waiting place setting unit 68 sends a movement instruction to the autonomous driving vehicle 10 reserved for dispatch to instruct to move to the parking lot 118A of the contracted facility (S16).

In the above, the guide map generation unit 63 sends map information (dynamic map data) to the autonomous driving vehicle 10, the map information including a running route connecting the current location of the autonomous driving vehicle 10, the waiting place, the boarding place, and the destination. Having received the map information, the autonomous driving vehicle 10 starts autonomous running toward the neighbor parking lot 118A, or a waiting place. As described above, having the autonomous driving vehicle 10 wait in or near a boarding place before the scheduled boarding time makes it possible to prevent delay of the autonomous driving vehicle 10 in arriving at the scheduled boarding time.

As the boarding place is set to the neighbor parking lot 118A, as described above, the user can receive a preferential service at the commercial facility 120 adjoining the neighbor parking lot 118 (refer to FIG. 5). In other words, if the user drops by the commercial facility 120 before the scheduled boarding time to shop there using a preferential service, increase in sales of the commercial facility 120 is expected.

On the other hand, in the case where the congestion rate of the parking lot 118A is equal to or greater than the congestion threshold at step S14, having an autonomous driving vehicle 10 wait in the parking lot may hinder convenience for users of the commercial facility 120, or a contracted shop adjoining the parking lot 118A. Thus, in such a case, the waiting place setting unit 68 keeps the autonomous driving vehicle 10 reserved for dispatch waiting in the current parking lot.

In the case where the congestion rate of the parking lot 118A is equal to or greater than the congestion threshold, generally, 100% or greater, the autonomous driving vehicle 10 cannot park and wait in the parking lot 118A. In such a case, if the boarding place is set to the parking lot 118A, the parking lot 118A is used as a so-called vehicle stop.

Specifically, the autonomous driving vehicle 10 takes a user on board in the passage space 126 of the parking lot 118A, and leaves the parking lot 118A promptly. This can reduce the period of time during which the autonomous driving vehicle 10 stays in the parking lot 118A to, for example, within ten minutes. In order words, shorting the period of time with the autonomous driving vehicle 10 staying in the parking lot 118A can reduce the influence of the autonomous driving vehicle 10 on users of the commercial facility 120 even when the parking lot 118A is congested.

As illustrated in FIG. 2, the autonomous driving vehicle 10 according to this embodiment is a small vehicle referred to as a so-called personal mobility vehicle. That is, the autonomous driving vehicle 10 is small in width and length, for example, compared with a typical automobile with a capacity of five passengers. For example, the minimum turning radius of an autonomous driving vehicle is about a half of that of a typical automobile with a capacity of five passengers. This enables the autonomous driving vehicle 10 to turn (U-turn), for example, in the passage space 126 of the parking lot 118A and thus to change the proceeding directions, for example, by turning without entering the parking spaces 124A to 124I. That is, as the autonomous driving 10 is a small vehicle, as described above, it is possible to reduce the influence of the autonomous driving vehicle 10 on users of the commercial facility 120 even when the parking lot 118A is congested.

<Prospective Vehicle Dispatch>

Although the autonomous driving vehicle 10 reserved for dispatch is parked in the parking lot 118A in the neighborhood of a boarding place to wait there in the above-described embodiment, the management system of an autonomous driving vehicle according to this embodiment is not limited to this format. For example, prospective vehicle dispatch may be employed to have an autonomous driving vehicle 10 not reserved for dispatch wait in advance in an area where designation of a boarding place is highly frequently made, as will be described later.

Specifically, referring to FIG. 4, the vehicle dispatch schedule storage unit 69D stores past vehicle dispatch reservation information. The past vehicle dispatch reservation information contains boarding place history that contains information on places having been set as a boarding place, and scheduled boarding time points.

Figure 15:
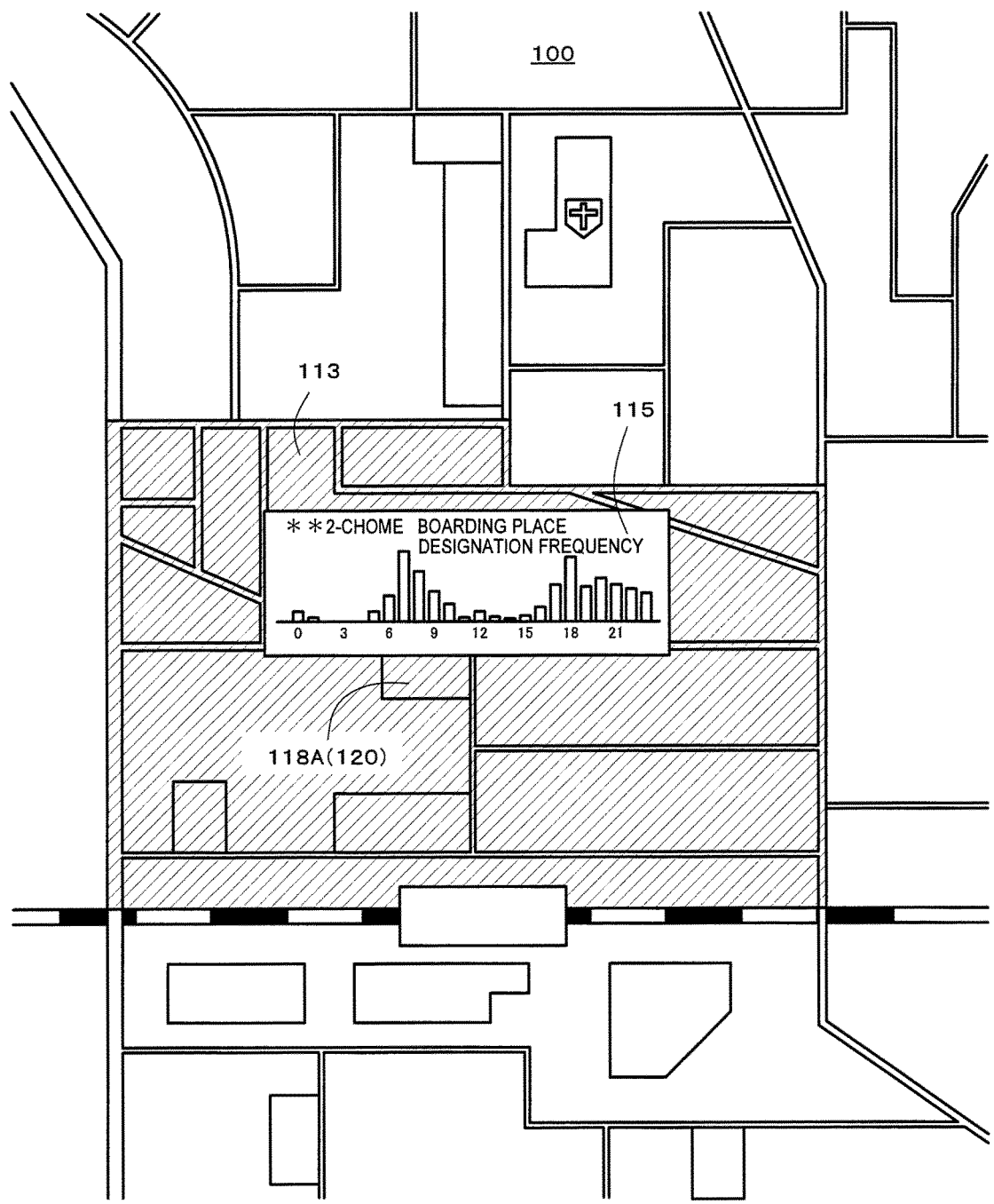
FIG. 15 is an exemplary histogram on the frequency of setting a boarding place for every area and for every time period.

Based on this information, the frequency of designation of a boarding place can be obtained for every time period and for every area, as illustrated in FIG. 15. For example, the congestion rate calculation unit 61 generates a boarding place designation frequency histogram 115 for every area and for every time period, as illustrated in FIG. 15, based on the boarding place history contained in the past vehicle dispatch reservation information. Specifically, for example, an average of one immediately preceding week for every time period is used as a boarding place designation frequency for every time period.

An area that is a unit of generation of a histogram is an area 113 containing at least one commercial facility 120, or a contracted shop. For example, the map stored in the map information storage unit 69C is segmented into a plurality of areas 113, each being a unit of generation of this histogram. The time period of the histogram is set to every hour, for example. Such a histogram enables specification of a highly frequent area having a highly frequent time period during which designation of a boarding place is made at a relatively high frequency.

Figure 16:
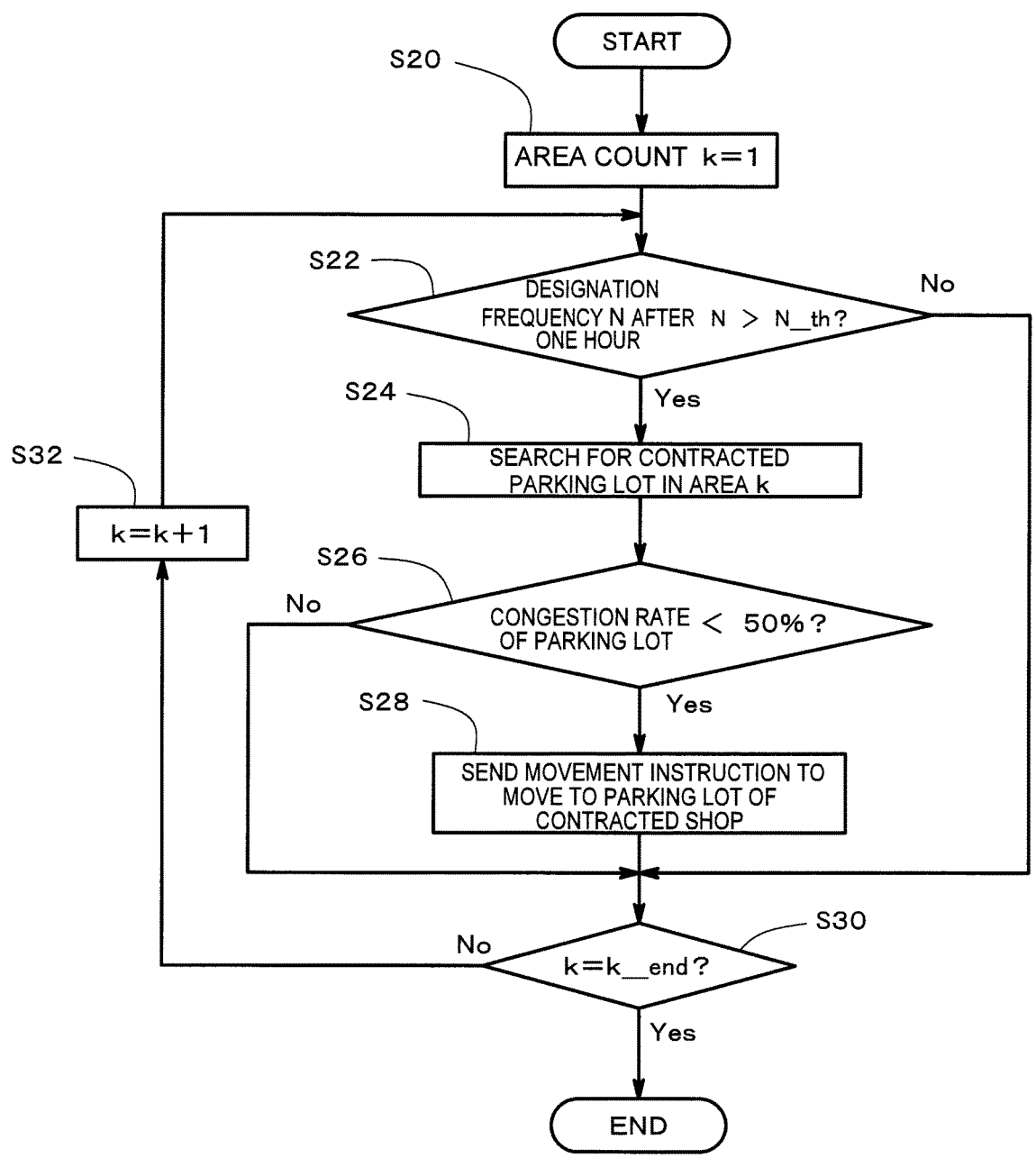
FIG. 16 is a flowchart of prospective vehicle dispatch.

FIG. 16 is a flowchart of a process for prospective vehicle dispatch. The congestion rate calculation unit 61 executes this process for prospective vehicle dispatch for every hour, for example, referring to the clock 64. Initially, the congestion rate calculation unit 61 sets an area count k to the initial value 1 (S20). The area count k is a count for an area 113 on a map, or a unit of generation of a histogram.

Then, referring to a histogram 115 with the area count k=1, the congestion rate calculation unit 61 obtains a boarding place designation frequency N for a time period beginning with the current time and ending at a time one hour after the current time, and determines whether the frequency N is in excess of a predetermined frequency threshold N_th (S22). In a case where the boarding place designation frequency N is equal to or less than the frequency threshold N_th, whether the area count k is a final value k_end is determined (S30). In a case where the area count k is a final value k_end, the process for prospective vehicle dispatch ends. Meanwhile, in a case where the area count k is yet to be the final value k_end, the area count k is incremented (S32), and the process returns to step S22.

On the other hand, in a case where the boarding place designation frequency N is in excess of the frequency threshold N_th at step S22, the area k is determined as a highly frequent area having a highly frequent time period during which designation of a boarding place is made with high frequency N. Then, the waiting place setting unit 68 searches for a parking lot (the parking lot 118A in the example illustrated in FIG. 15) of a contracted shop within the area k for use during a waiting time period before the highly frequent time period, for example, a time period one hour before the highly frequent time period (S24).

Then, the congestion rate calculation unit 61 obtains a captured image of the parking lot 118A found in the search, from the monitoring camera 90 (90A, 90B), and calculates the congestion rate of the parking lot 118A, based on the obtained captured image, using the above-described image recognition.

The waiting place setting unit 68 determines whether the calculated congestion rate is less than a predetermined congestion threshold (S26). Note that the congestion threshold is set to 50%, for example. In a case where the congestion rate is less than the congestion threshold, the waiting place setting unit 68 then searches for an autonomous driving vehicle 10 to wait in the found parking lot 118A as a waiting place.

For example, referring to the vehicle dispatch schedule stored in the vehicle dispatch schedule storage unit 69D, the waiting place setting unit 68 searches for an autonomous driving vehicle 10 not reserved for dispatch, or in a vacant state, during a period of time from the current time until a predetermined time. For example, an autonomous driving vehicle 10 not reserved for dispatch during two hours from the current time is searched for.

The waiting place setting unit 68 then sends a movement instruction to the autonomous driving vehicle 10 found in the search to instruct to move to the parking lot 118A of the contracted facility, set as a waiting place (S28). Besides the movement instruction, map information (dynamic map data) containing a running route including the parking lot 118A set as a waiting place, as described above, is sent from the guide map generation unit 63 to the autonomous driving vehicle 10.

As described above, having an autonomous driving vehicle 10 wait in an area and in a time period during which designation of a boarding place is expected to be made with high frequency makes it possible to promptly respond to an imminent reservation of vehicle dispatch. For example, in a case where the operation button 112E illustrated in FIG. 12 is displayed and a vehicle dispatch reservation for an imminent use of a vehicle is received, it is possible to prevent delay of an autonomous driving vehicle 10 in arriving at a scheduled boarding time.

The present disclosure is not limited to the present embodiments described above, and includes all changes and modifications without departing from the technical scope or the essence of the present disclosure defined by the claims.

The invention claimed is:

1. A management device of an autonomous driving vehicle, comprising:
a processor configured to
calculate a congestion rate of each of parking lots adjoining a plurality of respective commercial facilities; and
in response to the congestion rate of a neighbor parking lot during a waiting time period before a scheduled boarding time being less than a congestion threshold, set the neighbor parking lot as a waiting place where an autonomous driving vehicle reserved for dispatch waits during the waiting time period, wherein the neighbor parking lot is in a neighborhood of a boarding place contained in reservation information for the autonomous driving vehicle reserved for dispatch, and
cause the autonomous driving vehicle reserved for dispatch to move to the waiting place, wherein
the autonomous driving vehicle is a vehicle with a capacity of one or two passengers, a minimum turning radius of the autonomous driving vehicle being less than that of an automobile with a capacity of five passengers, and enabling the autonomous driving vehicle to turn in a passage space of the neighbor parking lot without entering a parking space of the neighbor parking lot, and the processor is further configured to, in response to the congestion rate being 100%,
- set the passage space as the boarding place, and
- cause the autonomous driving vehicle to leave the neighbor parking lot within a predetermined time period.

2. The management device according to claim 1, wherein the processor is further configured to,
- in response to the boarding place designated by a user when reserving vehicle dispatch being different from any of the parking lots adjoining the plurality of respective commercial facilities, send a suggestion message to the user to suggest change of the boarding place to a parking lot in the neighborhood of the boarding place designated; and
- in response to the boarding place being changed to the parking lot suggested with the suggestion message, grant to the user a preferential service usable in a commercial facility adjoining the parking lot that has been suggested.

\* \* \* \* \*